US012143797B2

(12) United States Patent
Fielder et al.

(10) Patent No.: US 12,143,797 B2
(45) Date of Patent: *Nov. 12, 2024

(54) REVERBERATION GENERATION FOR HEADPHONE VIRTUALIZATION

(71) Applicant: Dolby Laboratories Licensing Corporation, San Francisco, CA (US)

(72) Inventors: Louis D. Fielder, Millbrae, CA (US); Zhiwei Shuang, Beijing (CN); Grant A. Davidson, Burlingame, CA (US); Xiguang Zheng, Beijing (CN); Mark S. Vinton, Alameda, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,145

(22) Filed: Apr. 28, 2023

(65) Prior Publication Data

US 2023/0328469 A1 Oct. 12, 2023

Related U.S. Application Data

(60) Continuation of application No. 17/492,683, filed on Oct. 4, 2021, now Pat. No. 11,671,779, which is a (Continued)

(30) Foreign Application Priority Data

Feb. 12, 2015 (CN) ......................... 201510077020.3
Feb. 5, 2016 (CN) ......................... 201610081281.7

(51) Int. Cl.
*H04S 3/00* (2006.01)
*G10K 15/08* (2006.01)
(Continued)

(52) U.S. Cl.
CPC .............. *H04S 3/004* (2013.01); *G10K 15/08* (2013.01); *H04S 5/005* (2013.01); *H04S 7/302* (2013.01);
(Continued)

(58) Field of Classification Search
CPC .......... H04S 3/004; H04S 5/005; H04S 7/302; H04S 7/304; H04S 2400/01; H04S 2420/01; G10K 15/08
See application file for complete search history.

(56) References Cited

U.S. PATENT DOCUMENTS 5,717,767 A 2/1998 Inanaga
5,742,689 A 4/1998 Tucker
(Continued)

FOREIGN PATENT DOCUMENTS

CN 101040565 9/2007
CN 101263742 9/2008
(Continued)

OTHER PUBLICATIONS

Dobler D. et al., "Enhancing Three-dimensional Vision with Three-dimensional Sound", Siggraph 2004 Course Notes, Aug. 31, pp. 1-59, 2004.
(Continued)

*Primary Examiner* — David L Ton

(57) ABSTRACT

The present disclosure relates to reverberation generation for headphone virtualization. A method of generating one or more components of a binaural room impulse response (BRIR) for headphone virtualization is described. In the method, directionally-controlled reflections are generated, wherein directionally-controlled reflections impart a desired perceptual cue to an audio input signal corresponding to a sound source location. Then at least the generated reflections are combined to obtain the one or more components of the
(Continued)

BRIR. Corresponding system and computer program products are described as well.

8 Claims, 12 Drawing Sheets

Related U.S. Application Data division of application No. 16/986,308, filed on Aug. 6, 2020, now Pat. No. 11,140,501, which is a continuation of application No. 16/510,849, filed on Jul. 12, 2019, now Pat. No. 10,750,306, which is a continuation of application No. 16/163,863, filed on Oct. 18, 2018, now Pat. No. 10,382,875, which is a continuation of application No. 15/550,424, filed as application No. PCT/US2016/017594 on Feb. 11, 2016, now Pat. No. 10,149,082.

(60) Provisional application No. 62/117,206, filed on Feb. 17, 2015.

(51) Int. Cl.
*H04S 5/00* (2006.01)
*H04S 7/00* (2006.01)

(52) U.S. Cl.
CPC .......... *H04S 7/304* (2013.01); *H04S 2400/01* (2013.01); *H04S 2420/01* (2013.01)

(56) References Cited

U.S. PATENT DOCUMENTS

| | | | |
|---|---|---|---|
| 5,987,142 | A | 11/1999 | Courneau |
| 6,639,989 | B1 | 10/2003 | Zacharov |
| 7,099,482 | B1 | 8/2006 | Jot |
| 7,561,699 | B2 | 7/2009 | Jot |
| 7,876,903 | B2 | 1/2011 | Sauk |
| 7,936,887 | B2 | 5/2011 | Smyth |
| 8,045,718 | B2 | 10/2011 | Faure |
| 8,126,172 | B2 | 2/2012 | Horbach |
| 8,175,286 | B2 | 5/2012 | Bech |
| 8,265,284 | B2 | 9/2012 | Villemoes |
| 8,270,616 | B2 | 9/2012 | Slamka |
| 8,515,104 | B2 | 8/2013 | Dickins |
| 8,712,061 | B2 | 4/2014 | Jot |
| 9,215,544 | B2 | 12/2015 | Faure |
| 9,420,393 | B2 | 8/2016 | Morrell |
| 9,462,387 | B2 | 10/2016 | Oomen |
| 9,584,938 | B2 | 2/2017 | Chafe |
| 10,149,082 | B2 | 12/2018 | Fielder |
| 2002/0067836 | A1 | 6/2002 | Paranjpe |
| 2003/0007648 | A1 | 1/2003 | Currell |
| 2005/0213786 | A1 | 9/2005 | Kerneis |
| 2005/0276430 | A1 | 12/2005 | He |
| 2008/0031462 | A1 | 2/2008 | Walsh |
| 2009/0092259 | A1 | 4/2009 | Jot |
| 2010/0119075 | A1 | 5/2010 | Xiang |
| 2011/0135098 | A1 | 6/2011 | Kuhr |
| 2012/0082319 | A1 | 4/2012 | Jot |
| 2012/0243713 | A1 | 9/2012 | Hess |
| 2012/0328107 | A1 | 12/2012 | Nyström |
| 2013/0272527 | A1 | 10/2013 | Oomen |
| 2014/0153727 | A1 | 6/2014 | Walsh |
| 2014/0355796 | A1 | 12/2014 | Xiang |
| 2015/0223002 | A1 | 8/2015 | Mehta |
| 2015/0350801 | A1 | 12/2015 | Koppens |
| 2016/0142854 | A1 | 5/2016 | Fueg |
| 2016/0255453 | A1 | 9/2016 | Fueg |

FOREIGN PATENT DOCUMENTS

| | | | |
|---|---|---|---|
| CN | 101454825 | | 6/2009 |
| CN | 101661746 | | 3/2010 |
| CN | 101884065 | | 11/2010 |
| CN | 101490743 | B | 12/2011 |
| CN | 101133679 | B | 8/2012 |
| CN | 102665156 | | 9/2012 |
| CN | 103181192 | | 6/2013 |
| CN | 103270508 | | 8/2013 |
| CN | 103329576 | | 9/2013 |
| CN | 103517199 | | 1/2014 |
| CN | 103634733 | | 3/2014 |
| CN | 104240695 | | 12/2014 |
| DE | 102005003431 | | 8/2006 |
| EP | 2357854 | B1 | 3/2016 |
| EP | 2503799 | B1 | 7/2020 |
| JP | 07-334176 | | 12/1995 |
| JP | 2012065264 | | 3/2012 |
| JP | 2013243572 | | 12/2013 |
| WO | 2013064943 | A1 | 5/2013 |
| WO | 2013111038 | A1 | 8/2013 |
| WO | 2014111765 | | 7/2014 |
| WO | 2014111829 | | 7/2014 |
| WO | 2017019781 | | 2/2017 |

OTHER PUBLICATIONS

Griesinger D., "Objective Measures of Spaciousness and Envelopment", AES 16th International Conference on Spatial Sound Reproduction, XP055267954, pp. 27-41, Mar. 1, 1999.

Liitola T., "Headphone Sound Externalization", Science in Technology, Tampere, XP055267926, pp. I-74, Mar. 7, 2006.

Menzer F. et al., "Binaural Reverberation Using Two Parallel Feedback Delay Networks", 40th International Conference: Spatial Audio: Sense the Sound of Space, AES, XP040567074, pp. 1-10, Oct. 8, 2010.

Menzer F. et al., "Efficient Binaural Audio Rendering Using Independent Early and Diffuse Paths", AES Convention 132, XP040574548, pp. 1-9, Apr. 26, 2012.

Nakajima, T. et al "A Simple Method of Calculating the Interaural Cross-Correlatiion Function for a Sound Field" The Journal of the Acoustical Society of America, vol. 93, No. 2, Feb. 1, 1993, pp. 885-891.

Smyth S. et al., "Smyth SVS Headphone Surround Monitoring for Studios", 23rd UK Conference Audio Eng. Soc., Cambridge, pp. 1-7, Dec. 31, 2008.

Allen, J.B. et al "Image Method for Efficiently Simulating Small-Room Acoustics" J. Acoust. Soc. Am. 65, 1979, pp. 943-950.

Guo, Tian-Kui, "The Study on Simulating Binaural Room Impulse Response" IEEE International Conference on Computer Science and Information Technology, pp. 33-36, Jul. 9-11, 2010.

Hu, Hongmei, et al "Externalization of Headphone-Based Virtual Sound System" Journal of Southeast University, v. 38, No. 1, Jan. 1-5, 2008.

ITU-T Recommendation p. 862, "Wideband Extension to Recommendation for the Assessment of Wideband Telephone Networks and Speech Codecs", Nov. 2007, Perceptual Evaluation of Speech Quality.

Menzer, F. et al "Investigations on Modeling BRIR Tails with Filtered and Coherence-Matched Noise" AES Convention Paper 7852, presented at the 127th Convention, Oct. 9-12, 2009, New York, USA, pp. 1-9.

Menzer, Fritz "Binaural Audio Signal Processing Using Interaural Coherance Matching" Ecole Polytechnique Federal de Lausanne Thesis No. 4643, Apr. 2010.

Mickiewicz, W. et al "Headphone Processor Based on Individualized Head Related Transfer Functions Measured in Listening Room" AES Convention, May 1, 2004, pp. 1-6.

Rychtarikova, Monika "Perceptual Validation of Virtual Room Acoustics: Sound Localisation and Speech Understanding" Applied Acoustics, v. 72, No. 4, pp. 196-204, Mar. 2011.

Sabine, Wallace Clement, "Collected Papers on Acoustics" Harvard University Press, USA, 1922.

Werner, S. et al "Effects of Shaping of Binaural Room Impulse Responses on Localization" 5th International Workshop on Quality of Multimedia Experience, pp. 88-93, Jul. 2013.

REVERBERATION GENERATION FOR HEADPHONE VIRTUALIZATION

CROSS-REFERENCE TO RELATED APPLICATIONS

This application is a continuation of U.S. application Ser. No. 17/492,683, filed Oct. 4, 2021, which is a division of U.S. application Ser. No. 16/986,308, filed Aug. 6, 2020, now U.S. Pat. No. 11,140,501, which is continuation of U.S. application Ser. No. 16/510,849 filed Jul. 12, 2019, now U.S. Pat. No. 10,750,306, which is continuation of U.S. application Ser. No. 16/163,863 filed Oct. 18, 2018, now U.S. Pat. No. 10,382,875, which is continuation of U.S. application Ser. No. 15/550,424 filed Aug. 11, 2017, now U.S. Pat. No. 10,149,082, which is U.S. national phase of International Application No. PCT/US2016/017594 filed Feb. 11, 2016, which claims priority to U.S. Provisional Application No. 62/117,206 filed 17 Feb. 2015, Chinese Patent Application No. 201510077020.3 filed 12 Feb. 2015 and Chinese Application No. 201610081281.7 filed 5 Feb. 2016, each of which is incorporated by reference in its entirety.

TECHNOLOGY

Embodiments of the present disclosure generally relate to audio signal processing, and more specifically, to reverberation generation for headphone virtualization.

BACKGROUND

In order to create a more immersive audio experience, binaural audio rendering can be used so as to impart a sense of space to 2-channel stereo and multichannel audio programs when presented over headphones. Generally, the sense of space can be created by convolving appropriately-designed Binaural Room Impulse Responses (BRIRs) with each audio channel or object in the program, wherein the BRIR characterizes transformations of audio signals from a specific point in a space to a listener's ears in a specific acoustic environment. The processing can be applied either by the content creator or by the consumer playback device.

An approach of virtualizer design is to derive all or part of the BRIRs from either physical room/head measurements or room/head model simulations. Typically, a room or room model having very desirable acoustical properties is selected, with the aim that the headphone virtualizer can replicate the compelling listening experience of the actual room. Under the assumption that the room model accurately embodies acoustical characteristics of the selected listening room, this approach produces virtualized BRIRs that inherently apply the auditory cues essential to spatial audio perception. Auditory cues may, for example, include interaural time difference (ITD), interaural level difference (ILD), interaural crosscorrelation (IACC), reverberation time (e.g., T60 as a function of frequency), direct-to-reverberant (DR) energy ratio, specific spectral peaks and notches, echo density and the like. Under ideal BRIR measurements and headphone listening conditions, binaural audio renderings of multichannel audio files based on physical room BRIRs can sound virtually indistinguishable from loudspeaker presentations in the same room.

However, a drawback of this approach is that physical room BRIRs can modify the signal to be rendered in undesired ways. When BRIRs are designed with adherence to the laws of room acoustics, some of the perceptual cues that lead to a sense of externalization, such as spectral combing and long T60 times, also cause side-effects such as sound coloration and time smearing. In fact, even top-quality listening rooms will impart some side-effects to the rendered output signal that are not desirable for headphone reproduction. Furthermore, the compelling listening experience that can be achieved during listening to binaural content in the actual measurement room is rarely achieved during listening to the same content in other environments (rooms).

SUMMARY

In view of the above, the present disclosure provides a solution for reverberation generation for headphone virtualization.

In one aspect, an example embodiment of the present disclosure provides a method of generating one or more components of a binaural room impulse response (BRIR) for headphone virtualization. In the method, directionally-controlled reflections are generated, wherein the directionally-controlled reflections impart a desired perceptual cue to an audio input signal corresponding to a sound source location, and then at least the generated reflections are combined to obtain the one or more components of the BRIR.

In another aspect, another example embodiment of the present disclosure provides a system of generating one or more components of a binaural room impulse response (BRIR) for headphone virtualization. The system includes a reflection generation unit and a combining unit. The reflection generation unit is configured to generate directionally-controlled reflections that impart a desired perceptual cue to an audio input signal corresponding to a sound source location. The combining unit is configured to combine at least the generated reflections to obtain the one or more components of the BRIR.

Through the following description, it would be appreciated that, in accordance with example embodiments of the present disclosure, a BRIR late response is generated by combining multiple synthetic room reflections from directions that are selected to enhance the illusion of a virtual sound source at a given location in space. The change in reflection direction imparts an IACC to the simulated late response that varies as a function of time and frequency. IACC primarily affects human perception of sound source externalization and spaciousness. It can be appreciated by those skilled in the art that in example embodiments disclosed herein, certain directional reflection patterns can convey a natural sense of externalization while preserving audio fidelity relative to prior-art methods. For example, the directional pattern can be of an oscillatory (wobble) shape. In addition, by introducing a diffuse directional component within a predetermined range of azimuths and elevations, a degree of randomness is imparted to the reflections, which can heighten the sense of naturalness. In this way, the method aims to capture the essence of a physical room without its limitations.

A complete virtualizer can be realized by combining multiple BRIRs, one for each virtual sound source (fixed loudspeaker or audio object). In accordance with the first example above, each sound source has a unique late response with directional attributes that reinforce the sound source location. A key advantage of this approach is that a higher direct-to-reverberation (DR) ratio can be utilized to achieve the same sense of externalization as conventional synthetic reverberation methods. The use of higher DR ratios leads to fewer audible artifacts in the rendered binaural signal, such as spectral coloration and temporal smearing.

DESCRIPTION OF DRAWINGS

Through the following detailed description with reference to the accompanying drawings, the above and other objectives, features and advantages of embodiments of the present disclosure will become more comprehensible. In the drawings, several example embodiments of the present disclosure will be illustrated in an example and non-limiting manner, wherein.

Throughout the drawings, the same or corresponding reference symbols refer to the same or corresponding parts.

DESCRIPTION OF EXAMPLE EMBODIMENTS

Figure 1:
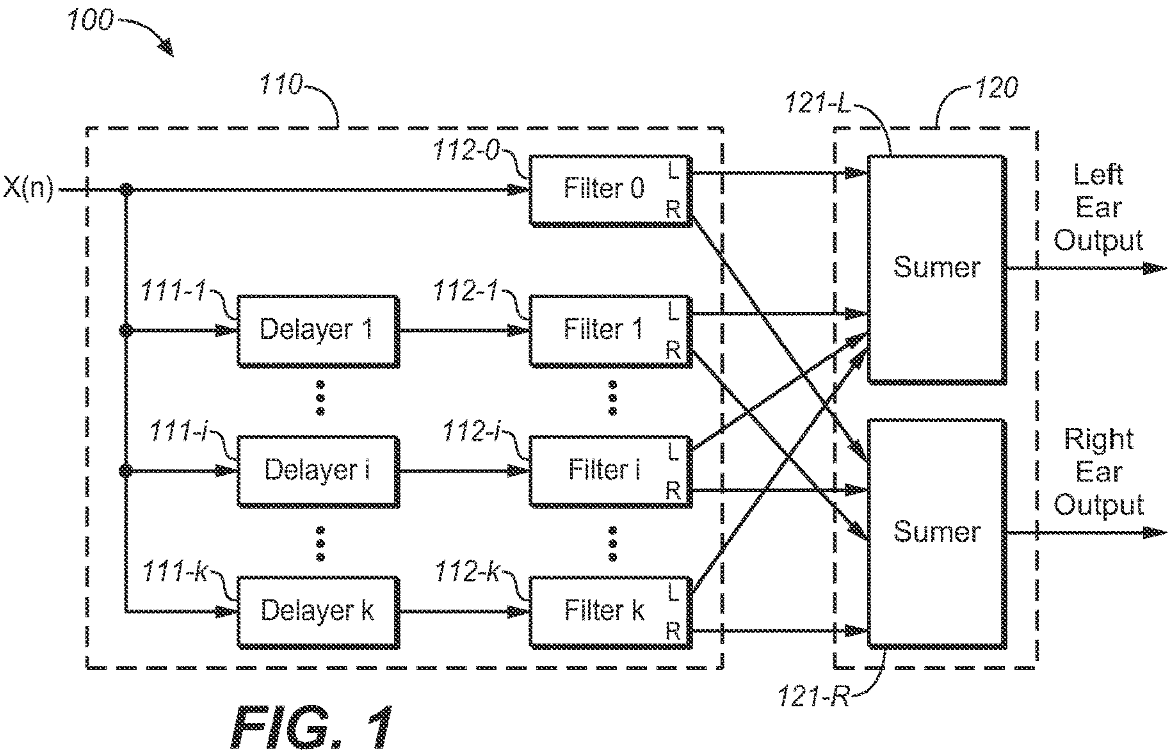
FIG. 1 is a block diagram of a system of reverberation generation for headphone virtualization in accordance with an example embodiment of the present disclosure.

Principles of the present disclosure will now be described with reference to various example embodiments illustrated in the drawings. It should be appreciated that depiction of these embodiments is only to enable those skilled in the art to better understand and further implement the present disclosure, not intended for limiting the scope of the present disclosure in any manner.

In the accompanying drawings, various embodiments of the present disclosure are illustrated in block diagrams, flow charts and other diagrams. Each block in the flowcharts or block may represent a module, a program, or a part of code, which contains one or more executable instructions for performing specified logic functions. Although these blocks are illustrated in particular sequences for performing the steps of the methods, they may not necessarily be performed strictly in accordance with the illustrated sequence. For example, they might be performed in reverse sequence or simultaneously, depending on the nature of the respective operations. It should also be noted that block diagrams and/or each block in the flowcharts and a combination of thereof may be implemented by a dedicated hardware-based system for performing specified functions/operations or by a combination of dedicated hardware and computer instructions.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment".

As used herein, the term "audio object" or "object" refers to an individual audio element that exists for a defined duration of time in the sound field. An audio object may be dynamic or static. For example, an audio object may be human, animal or any other object serving as a sound source in the sound field. An audio object may have associated metadata that describes the location, velocity, trajectory, height, size and/or any other aspects of the audio object. As used herein, the term "audio bed" or "bed" refers to one or more audio channels that are meant to be reproduced in pre-defined, fixed locations. As used herein, the term "BRIR" refers to the Binaural Room Impulse Responses (BRIRs) with each audio channel or object, which characterizes transformations of audio signals from a specific point in a space to listener's ears in a specific acoustic environment. Generally speaking, a BRIR can be separated into three regions. The first region is referred to as the direct response, which represents the impulse response from a point in anechoic space to the entrance of the ear canal. This direct response is typically of around 5 ms duration or less, and is more commonly referred to as the Head-Related Transfer Function (HRTF). The second region is referred to as early reflections, which contains sound reflections from objects that are closest to the sound source and a listener (e.g. floor, room walls, furniture). The third region is called the late response, which includes a mixture of higher-order reflections with different intensities and from a variety of directions. This third region is often described by stochastic parameters such as the peak density, model density, energy-decay time and the like due to its complex structures. The human auditory system has evolved to respond to perceptual cues conveyed in all three regions. The early reflections have a modest effect on the perceived direction of the source but a stronger influence on the perceived timbre and distance of the source, while the late response influences the perceived environment in which the sound source is located. Other definitions, explicit and implicit, may be included below.

As mentioned hereinabove, in a virtualizer design derived from a room or room model, the BRIRs have properties determined by the laws of acoustics, and thus the binaural renders produced therefrom contain a variety of perceptual cues. Such BRIRs can modify the signal to be rendered over headphones in both desirable and undesirable ways. In view of this, in embodiments of the present disclosure, there is provided a novel solution of reverberation generation for headphone virtualization by lifting some of the constraints imposed by a physical room or room model. One aim of the proposed solution is to impart in a controlled manner only the desired perceptual cues into a synthetic early and late response. Desired perceptual cues are those that convey to listeners a convincing illusion of location and spaciousness with minimal audible impairments (side effects). For example, the impression of distance from the listener's head to a virtual sound source at a specific location may be enhanced by including room reflections in the early portion of the late response having direction of arrivals from a limited range of azimuths/elevations relative to the sound source. This imparts a specific IACC characteristic that leads to a natural sense of space while minimizing spectral coloration and time-smearing. The invention aims to provide a more compelling listener experience than conventional stereo by adding a natural sense of space while substantially preserving the original sound mixer's artistic intent.

Hereinafter, reference will be made to FIGS. 1 to 9 to describe some example embodiments of the present disclosure. However, it should be appreciated that these descriptions are made only for illustration purposes and the present disclosure is not limited thereto.

Reference is first made to FIG. 1, which shows a block diagram of a one-channel system 100 for headphone virtualization in accordance with one example embodiment of the present disclosure. As shown, the system 100 includes a reflection generation unit 110 and a combining unit 120. The generation unit 110 may be implemented by, for example, a filtering unit 110.

The filtering unit 110 is configured to convolve a BRIR containing directionally-controlled reflections that impart a desired perceptual cue with an audio input signal corresponding to a sound source location. The output is a set of left- and right-ear intermediate signals. The combining unit 120 receives the left- and right-ear intermediate signals from the filtering unit 110 and combines them to form a binaural output signal.

As mentioned above, embodiments of the present disclosure are capable of simulating the BRIR response, especially the early reflections and the late response to reduce spectral coloration and time-smearing while preserving naturalness. In embodiments of the present disclosure, this can be achieved by imparting directional cues into the BRIR response, especially the early reflections and the late response in a controlled manner. In other words, direction control can be applied to these reflections. Particularly, the reflections can be generated in such a way that they have a desired directional pattern, in which directions of arrival have a desired change as function of time.

The example embodiments disclosed herein provide that a desirable BRIR response can be generated using a predetermined directional pattern to control the reflection directions. In particular, the predetermined directional pattern can be selected to impart perceptual cues that enhance the illusion of a virtual sound source at a given location in space. As one example, the predetermined directional pattern can be of a wobble function. For a reflection at a given point in time, the wobble function determines wholly or in part the direction of arrival (azimuth and/or elevation). The change in reflection directions creates a simulated BRIR response with IACC that varies as a function of time and frequency. In addition to the ITD, the ILD, the DR energy ratio, and the reverberation time, the IACC is also one of the primary perceptual cues that affect listener's impression of sound source externalization and spaciousness. However, it is not well-known in the art which specific evolving patterns of IACC across time and frequency are most effective for conveying a sense of 3-dimensional space while preserving the sound mixer' artistic intent as much as possible. Example embodiments described herein provide that specific directional reflections patterns, such as the wobble shape of reflections, can convey a natural sense of externalization while preserving audio fidelity relative to conventional methods.

Figure 2:
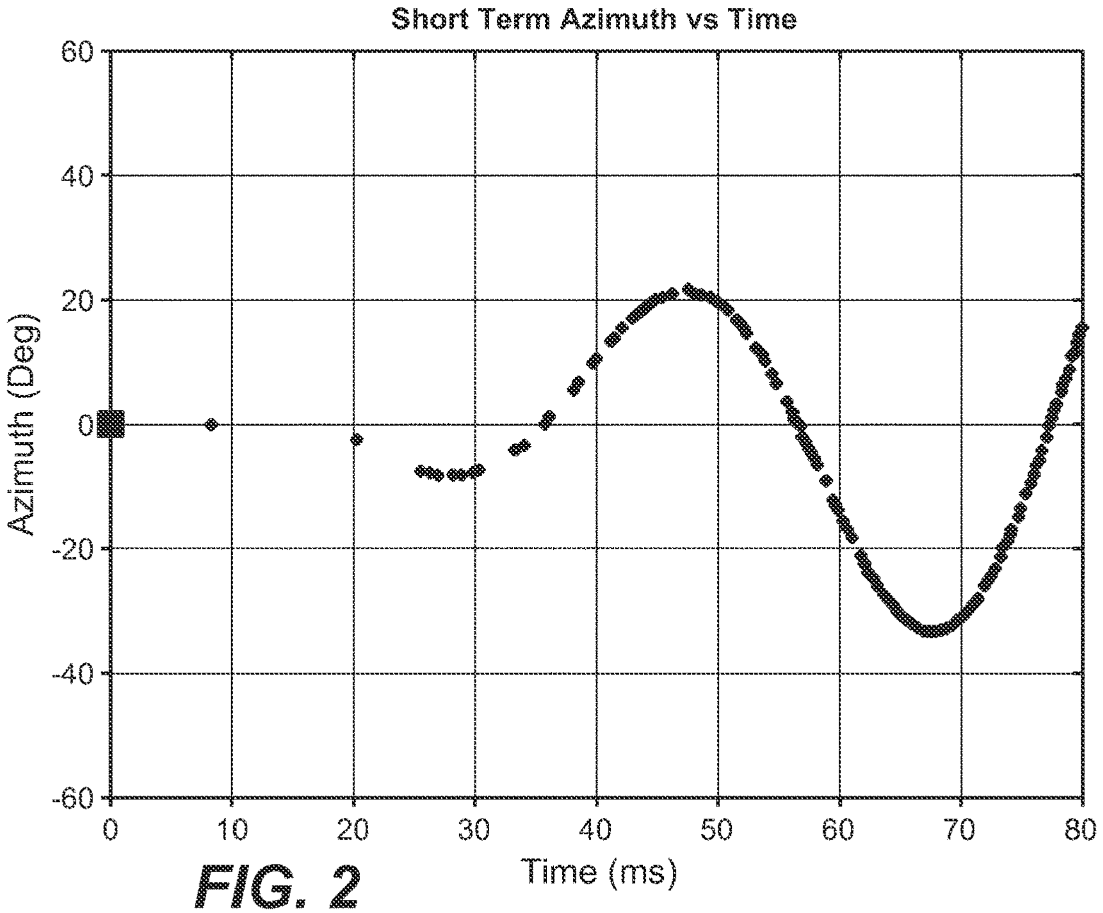
FIG. 2 illustrates a diagram of a predetermined directional pattern in accordance with an example embodiment of the present disclosure.

FIG. 2 illustrates a predetermined directional pattern in accordance with an example embodiment of the present disclosure. In FIG. 2 a wobble trajectory of synthesized reflections is illustrated, wherein each dot represents a reflection component with an associated azimuthal direction, and the sound direction of the first arrival signal is indicated by the black square at the time origin. From FIG. 2, it is clear that the reflection directions change away from the direction of the first arrival signal and oscillate around it while the reflection density generally increases with time.

In BRIRs measured in rooms with good externalization, strong and well defined directional wobbles are associated with good externalization. This can be seen from FIGS. 3A and 3B, which illustrate examples of the apparent direction changes when 4 ms segments from BRIRs with good and poor externalization are auditioned by headphone listening.

Figure 3A:
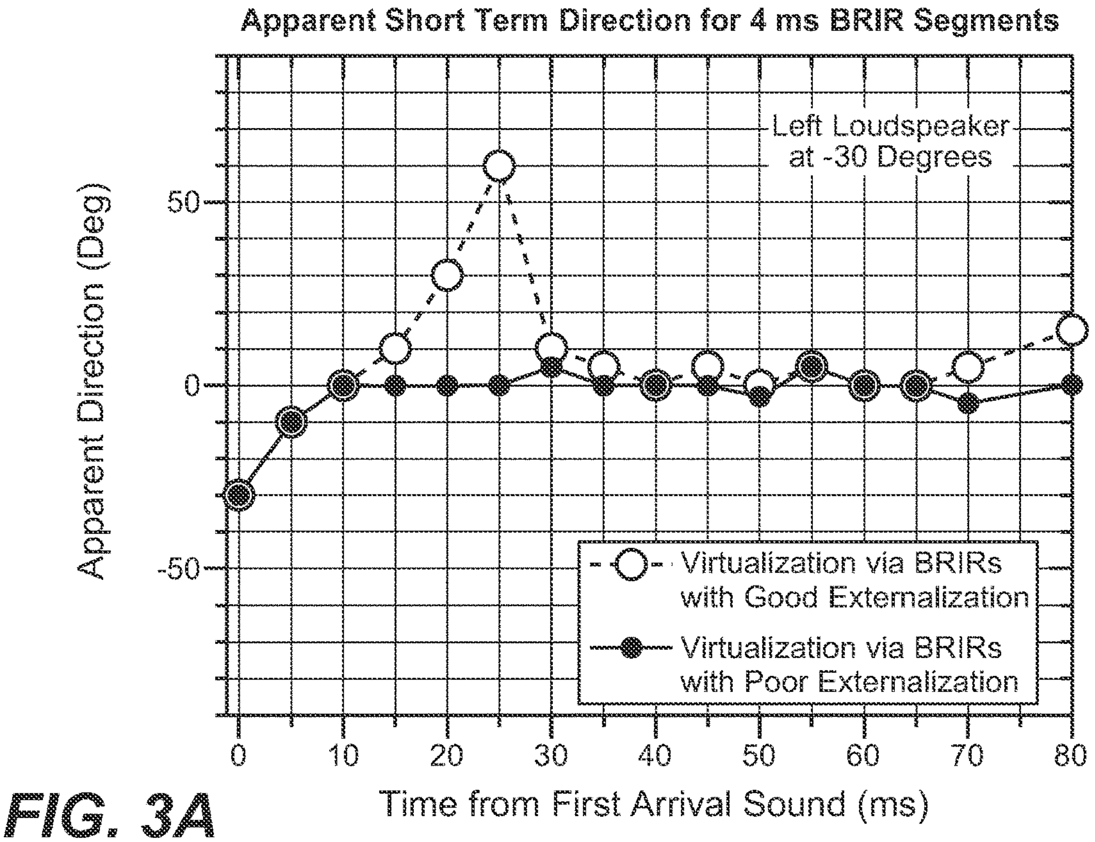
FIGS. 3A and 3B illustrate diagrams of short-time apparent direction changes over time for well and poorly externalizing BRIR pairs for left and right channel loudspeakers, respectively.
Figure 3B:
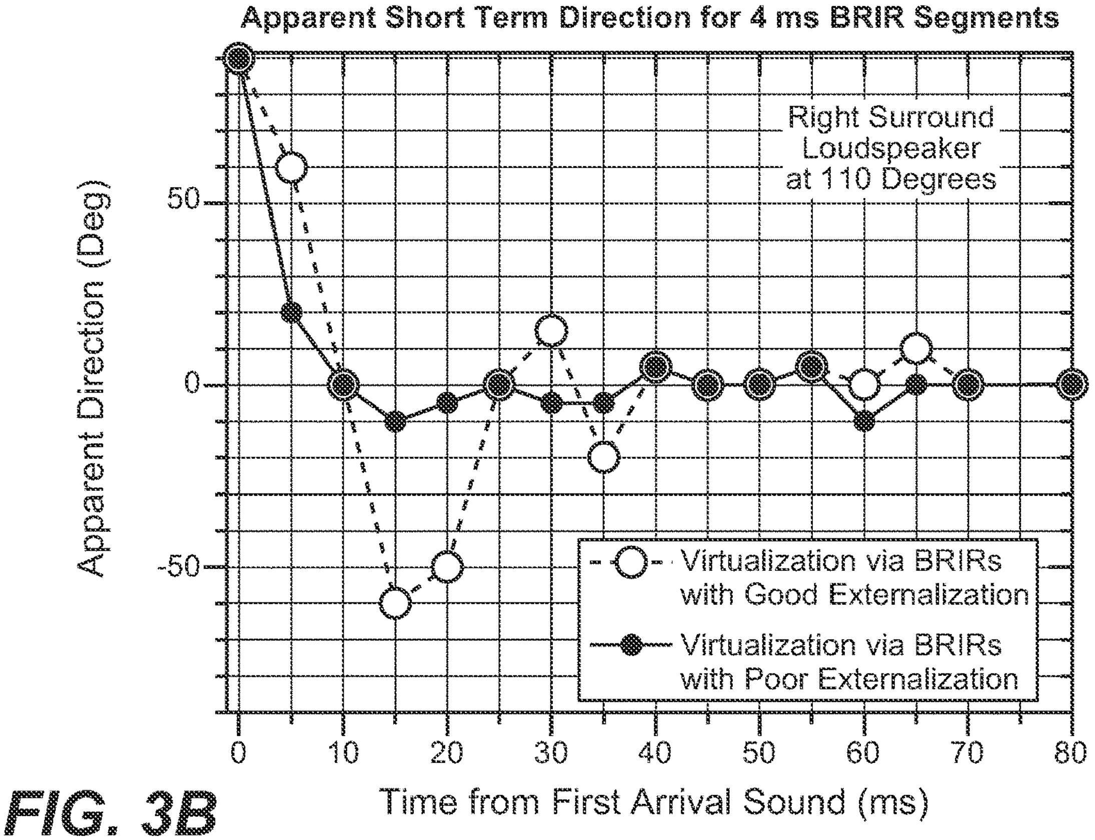

From FIGS. 3A and 3B, it can be clearly seen that good externalization is associated with strong directional wobbles. The short-term directional wobbles exist not only in the azimuthal plane but also in the medial plane. This is true because reflections in a conventional 6-surface room are a 3-dimensional phenomenon, not just a 2-dimensional one. Therefore, reflections in a time interval of 10-50 ms may also produce short-term directional wobbles in elevation. Therefore, the inclusion of these wobbles in BRIR pairs can be used to increase externalization.

Practical application of short-term directional wobbles for all the possible source directions in an acoustic environment can be accomplished via a finite number of directional wobbles to use for the generation of a BRIR pair with good externalization. This can be done, for example, by dividing up the sphere of all vertical and horizontal directions for first-arrival sound directions into a finite number of regions. A sound source coming from a particular region is associated with two or more short-term directional wobbles for that region to generate a BRIR pair with good externalization. That is to say, the wobbles can be selected based on the direction of the virtual sound source.

Based on analyses of room measurements, it can be seen that sound reflections typically first wobble in direction but rapidly become isotropic, thereby creating a diffuse sound field. Therefore, it is useful to include a diffuse or stochastic component in creating a good externalizing BRIR pair with a natural sound. The addition of diffuseness is a tradeoff among the natural sound, externalization, and focused source size. Too much diffuseness might create a very broad and poor directionally defined sound source. On the other hand, too little diffuseness can result in unnatural echoes coming from the sound source. As a result, a moderate growth of randomness in source direction is desirable, which means that the randomness shall be controlled to a certain degree. In an embodiment of the present disclosure, the directional range is limited within a predetermined azimuths range to cover a region around the original source direction, which may result in a good tradeoff among naturalness, source width, and source direction.

Figure 4:
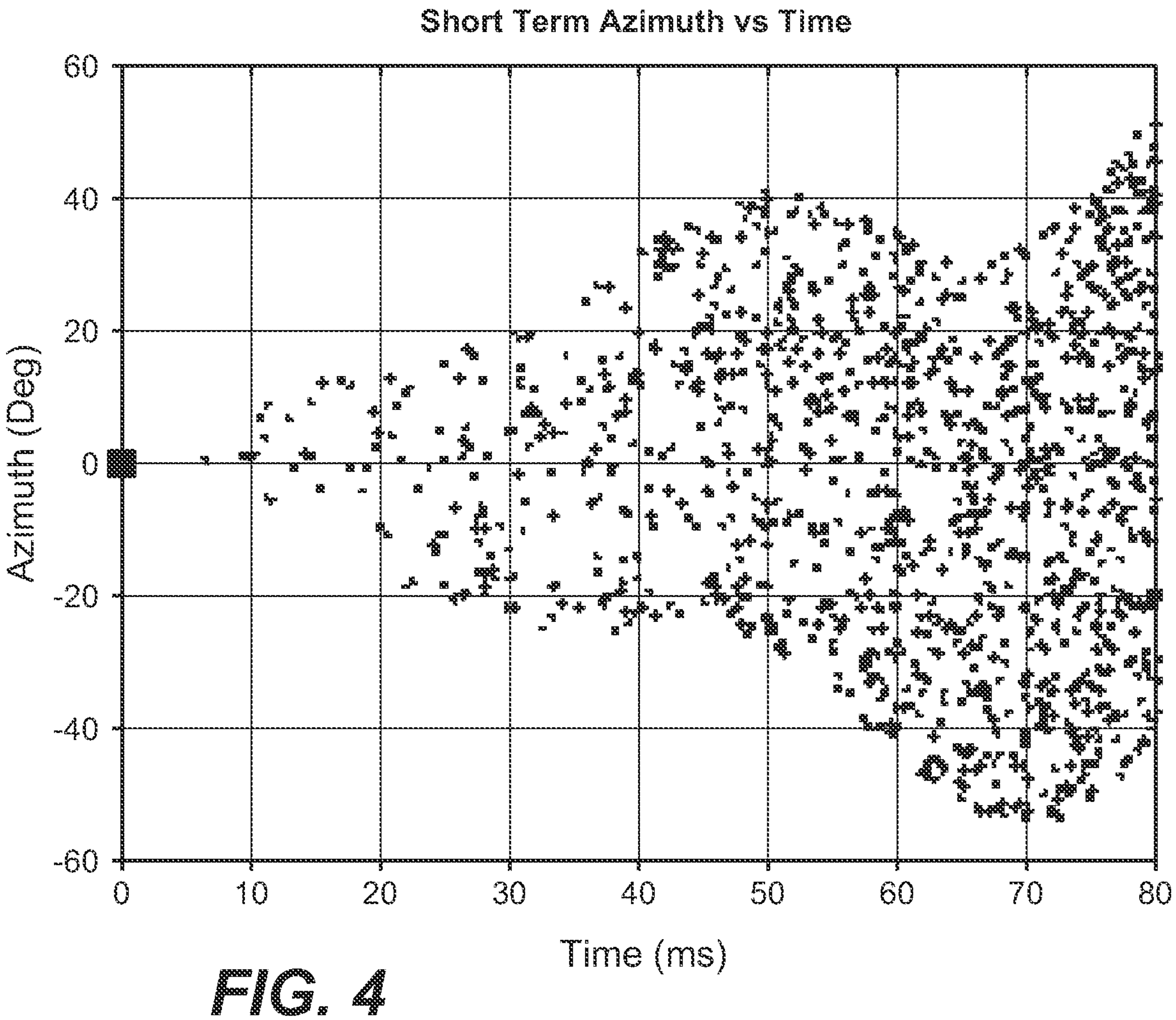
FIG. 4 illustrates a diagram of a predetermined directional pattern in accordance with another example embodiment of the present disclosure.

FIG. 4 further illustrates a predetermined directional pattern in accordance with another example embodiment of the present disclosure. Particularly, in FIG. 4 are illustrated reflection directions as a function of time for an example azimuthal short-term directional wobbles and the added diffuse component for a center channel. The reflection directions of arrival initially emanate from a small range of azimuths and elevations relative to the sound source, and then expand wider over time. As illustrated in FIG. 4, the slowly-varying directional wobble from FIG. 2 is combined with an increasing stochastic (random) direction component to create diffuseness. The diffuse component as illustrated in FIG. 4 linearly grows to ±45 degrees at 80 ms, and the full range of azimuths is only ±60 degrees relative to the sound source, compared to ±180 degrees in a six-sided rectangular room. The predetermined directional pattern may also include a portion of reflections with direction of arrival from below the horizontal plane. Such a feature is useful for simulating ground reflections that are important to the human auditory system for localizing front horizontal sound sources at the correct elevation.

In view of the fact that the addition of the diffuse component introduces further diffuseness, the resulting reflections and the associated directions for the BRIR pair as illustrated in FIG. 4 can achieve better externalization. In fact, similar to the wobbles, the diffuse component can be also selected based on the direction of the virtual sound source. In this way, it is possible to generate a synthetic BRIR that imparts the perceptual effect of enhancing the listener's sense of sound source location and externalization.

These short-term directional wobbles usually cause the sounds in each ear to have the real part of the frequency dependent IACC to have strong systematic variations in a time interval (for example, 10-50 ms) before the reflections become isotropic and uniform in the direction as mentioned earlier. As the BRIR evolves later in time, the IACC real values above about 800 Hz drop due to increased diffuseness of the sound field. Thus, the real part of the IACC derived from left- and right-ear responses varies as a function of frequency and time. The use of the frequency dependent real part has an advantage that it reveals correlation and anti-correlation characteristics and it is a useful metric for virtualization.

In fact, there are many characteristics in the real part of the IACC that create strong externalization, but the persistence of the time varying correlation characteristics over a time interval (for example 10 to 50 ms) may indicate good externalization. With example embodiments as disclosed herein, it may produce the real part of IACCs having higher values, which means a higher persistence of correlation (above 800 Hz and extending to 90 ms) than that would occur in a physical room. Thus, with example embodiments as disclosed herein it may obtain better virtualizers.

In an embodiment of the present disclosure, the coefficients for filtering unit 110 can be generated using a stochastic echo generator to obtain the early reflections and late response with the transitional characteristics described above. As illustrated in FIG. 1 the filtering unit can include delayers 111-1, . . . , 111-*i*, . . . , 111-*k* (collectively referred to as 111 hereinafter), and filters 112-0, 112-1, . . . , 112-*i*, . . . 112-*k* (collectively referred to as 112 hereinafter). The delayers 111 can be represented by $Z^{-ni}$, wherein i=1 to k. The coefficients for filters 112 may be, for example, derived from an HRTF data set, where each filter provides perceptual cues corresponding to one reflection from a predetermined direction for both the left ear and the right ear. As illustrated in FIG. 1, in each signal line, there is a delayer and filter pair, which could generate one intermediate signal (e.g. reflection) from a known direction at a predetermined time. The combining unit 120 includes, for example, a left summer 121-L and a right summer 121-R. All left ear intermediate signals are mixed in the left summer 121-L to produce the left binaural signal. Similarly, all right ear intermediate signals are mixed in the right summer 121-R to produce the right binaural signal. In such a way, reverberation can be generated from the generated reflections with the predetermined directional pattern, together with the direct response generated by the filter 112-0 to produce the left and right binaural output signal.

In an embodiment of the present disclosure, operations of the stochastic echo generator can be implemented as follows. First, at each time point as the stochastic echo generator progresses along the time axis, an independent stochastic binary decision is first made to decide whether a reflection should be generated at the given time instant. The probability of a positive decision increases with time, preferably quadratically, for increasing the echo density. That is to say, the occurrence time points of the reflections can be determined stochastically, but at the same time, the determination is made within a predetermined echo density distribution constraint so as to achieve a desired distribution. The output of the decision is a sequence of the occurrence time points of the reflections (also called as echo positions), $n_1$, $n_2$, . . . , $n_k$, which respond to the delay time of the delayers 111 as illustrated in FIG. 1. Then, for a time point, if a reflection is determined to be generated, an impulse responses pair will be generated for the left ear and right ear according to the desired direction. This direction can be determined based on a predetermined function which represents directions of arrival as a function of time, such as a wobbling function. The amplitude of the reflection can be a stochastic value without any further control. This pair of impulse responses will be considered as the generated BRIR at that time instant. In PCT application WO2015103024 published on Jul. 9, 2015, it describes a stochastic echo generator in details, which is hereby incorporated by reference in its entirety.

For the illustration purpose, an example process for generating a reflection at a given occurrence time point will be described next with reference to FIG. 5 to enable those skilled in the art to fully understand and further implement the proposed solution in the present disclosure.

Figure 5:
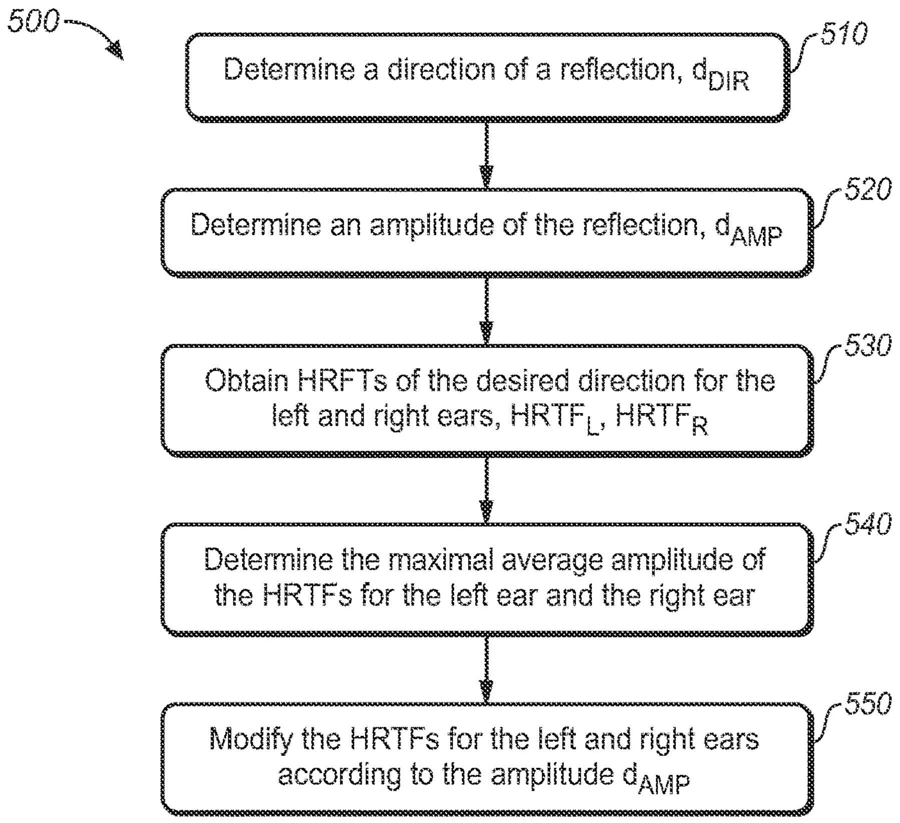
FIG. 5 illustrates a method for generating a reflection at a given occurrence time point in accordance with an example embodiment of the present disclosure.

FIG. 5 illustrates a method for generating a reflection at a given occurrence time point (500) in accordance with an example embodiment of the present disclosure As illustrated in FIG. 5 the method 500 is entered at step 510, where a direction of the reflection $d_{DIR}$ is determined based a predetermined direction pattern (for example a direction pattern function) and the given occurrence time point. Then, at step 520, the amplitude of the reflection $d_{AMP}$ is determined, which can be a stochastic value. Next, filters such as HRTFs with the desired direction are obtained at step 530. For example, $HRTF_L$ and $HRTF_R$ may be obtained for the left ear and the right ear, respectively. Particularly, the HRTFs can be retrieved from a measured HRTF data set for particular directions. The measured HRTF data set can be formed by measuring the HRTF responses offline for particular measurement directions. In such a way, it is possible to select a HRTF with the desired direction from HRTFs data set during generating the reflection. The selected HRTFs correspond to filters 112 at respective signal lines as illustrated in FIG. 1.

At step 540, the maximal average amplitudes of the HRTFs for the left ear and the right ear can be determined. Specifically, the average amplitude of the retrieved HRTFs of the left ear and the right ear can be first calculated respectively and then the maximal one of the average amplitudes of the HRTFs of left ear and right ear is further determined, which can be represented as but not limited to:

$$Amp_{max}=\max(|HRTF_L|,|HRTF_R|) \quad \text{(Eq. 1)}$$

Next, at step 550, the HRTFs for the left and right ears are modified. Particularly, the maximal average amplitudes of HRTFs for both the left and the right ear are modified according to the determined amplitude $d_{AMP}$ In an example embodiment of the present disclosure, it can be modified as hut not limited to:

$$HRTF_{LM} = \frac{d_{AMP}}{\text{Amp}_{Max}} HRTF_L \quad \text{(Eq. 2A)}$$

$$HRTF_{RM} = \frac{d_{AMP}}{\text{Amp}_{Max}} HRTF_R \quad \text{(Eq. 2B)}$$

As a result, two reflections with a desired directional component for the left ear and the right ear respectively can be obtained at a given time point, which are output from the respective filters as illustrated in FIG. 1. The resulting $HRTF_{LM}$ is mixed into the left ear BRIR as a reflection for the left ear, while $HRTF_{RM}$ is mixed into the right ear BRIR as a reflection for the right ear. The process of generating and mixing reflections into the BRIR to create synthetic reverberation continues until the desired BRIR length is reached. The final BRIR includes a direct response for left and right ears, followed by the synthetic reverberation.

In the embodiments of the present disclosure disclosed hereinabove, the HRTF responses can be measured offline for particular measurement directions so as to form an HRTF data set. Thus during generating of reflections, the HRTF responses can be selected from the measured HRTF data set according to the desired direction. Since an HRTF response in the HRTF data set represents an HRTF response for a unit impulse signal, the selected HRTF will be modified by the determined amplitude $d_{AMP}$ to obtain the response suitable for the determined amplitude. Therefore, in this embodiment of the present disclosure, the reflections with the desired direction and the determined amplitude are generated by selecting suitable HRTFs based on the desired direction from the HRTF data sets and further modifying the HRTFs in accordance with the amplitudes of the reflections.

However, in another embodiment of the present disclosure, the HRTFs for the left and right ears $HRTF_L$ and $HRTF_R$ can be determined based on a spherical head model instead of selecting from a measured HRTF data set. That is to say, the HRTFs can be determined based on the determined amplitude and a predetermined head model. In such a way, measurement efforts can be saved significantly.

In a further embodiment of the present disclosure, the HRTFs for the left and right ears $HRTF_L$ and $HRTF_R$ can be replaced by an impulse pair with similar auditory cues (For example, interaural time difference (ITD) and interaural level difference (ILD) auditory cues). That is to say, impulse responses for two ears can be generated based on the desired direction and the determined amplitude at the given occurrence time point and broadband ITD and ILD of a predetermined spherical head model. The ITD and ILD between the impulse response pair can be calculated, for example, directly based on $HRTF_L$ and $HRTF_R$. Or, alternatively, the ITD and ILD between the impulse response pair can be calculated based on a predetermined spherical head model. In general, a pair of all-pass filters, particularly multi-stage all-pass filters (APFs), may be applied to the left and right channels of the generated synthetic reverberation as the final operation of the echo generator. In such a way, it is possible to introduce controlled diffusion and decorrelation effects to the reflections and thus improve naturalness of binaural renders produced by the virtualizer.

Although specific methods for generating a reflection at given time instant are described, it should be appreciated that the present disclosure is not limited thereto; instead, any of other appropriate methods are possible to create similar transitional behavior. As another example, it is also possible to generate a reflection with a desired direction by means of, for example, an image model.

By progressing along the time axis, the reflection generator may generate reflections for a BRIR with controlled directions of arrival as a function of time.

In another embodiment of the present disclosure, multiple sets of coefficients for the filtering unit 110 can be generated so as to produce a plurality of candidate BRIRs, and then a perceptually-based performance evaluation can be made (such as spectral flatness, degree of match with a predetermined room characteristic, and so on) for example based on a suitably-defined objective function. Reflections from the BRIR with an optimal characteristic are selected for use in the filtering unit 110. For example, reflections with early reflection and late response characteristics that represent an optimal tradeoff between the various BRIR performance attributes can be selected as the final reflections. While in another embodiment of the present disclosure, multiple sets of coefficients for the filtering unit 110 can be generated until a desirable perceptual cue is imparted. That is to say, the desirable perceptual metric is set in advance, and if it is satisfied, the stochastic echo generator will stop its operations and output the resulting reflections.

Therefore, in embodiments of the present disclosure, there is provided a novel solution for reverberation for headphone virtualization, particularly, a novel solution for designing the early reflection and reverberant portions of binaural room impulse responses (BRIRs) in headphone virtualizers. For each sound source, a unique, direction-dependent late response will be used, and the early reflection and the late response are generated by combining multiple synthetic room reflections with directionally-controlled directions of arrival as a function of time. By applying a direction control on the reflections instead of using reflections measured based on a physical room or spherical head model, it is possible to simulate BRIR responses that impart desired perceptual cues while minimizing side-effects. In some embodiments of the present disclosure, the predetermined directional pattern is selected so that illusion of a virtual sound source at a given location in space is enhanced.

Particularly, the predetermined directional pattern can be, for example, a wobble shape with an additional diffuse component within a predetermined azimuth range. The change in reflection direction imparts a time-varying IACC, which provides further primary perceptual cues and thus conveys a natural sense of externalization while preserving audio fidelity. In this way, the solution could capture the essence of a physical room without its limitations.

In addition, the solution as proposed herein supports binaural virtualization of both channel-based and object-based audio program material using direct convolution or more computationally-efficient methods. The BRIR for a fixed sound source can be designed offline simply by combining the associated direct response with a direction-dependent late response. The BRIR for an audio object can be constructed on-the-fly during headphone rendering by combining the time-varying direct response with the early reflections and the late response derived by interpolating multiple late responses from nearby time-invariant locations in space.

Besides, in order to implement the proposed solution in a computationally-efficient manner, the proposed solution is also possible to be realized in a feedback delay network (FDN), which will be described hereinafter with reference to FIGS. 6 to 8.

As mentioned, in conventional headphone virtualizers, the reverberation of the BRIRs is commonly divided into two parts: the early reflections and the late response. Such a separation of the BRIRs allows dedicated models to simulate characteristics for each part of the BRIR. It is known that the early reflections are sparse and directional, while the late response is dense and diffusive. In such a case, the early reflections may be applied to an audio signal using a bank of delay lines, each followed by convolution with the HRTF pair corresponding to the associated reflection, while the late response can be implemented with one or more Feedback Delay Networks (FDN). The FDN can be implemented using multiple delay lines interconnected by a feedback loop with a feedback matrix. This structure can be used to simulate the stochastic characteristics of the late response, particularly the increase of the echo density over time. It is computationally more efficient compared to deterministic methods such as image model, and thus it is commonly used to derive the late response. For illustration purposes, FIG. 6 illustrates a block diagram of a general feedback delay network in the prior art.

Figure 6:
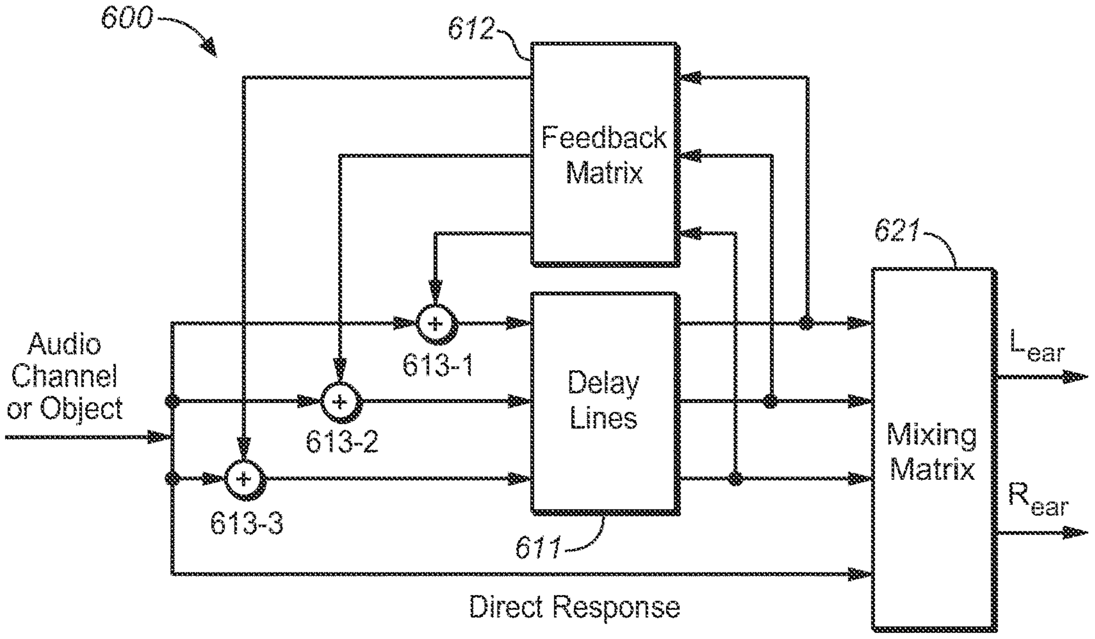
FIG. 6 is a block diagram of a general feedback delay network (FDN)

As illustrated in FIG. 6, the virtualizer 600 includes an FDN with three delay lines generally indicated by 611, interconnected by a feedback matrix 612. Each of delay lines 611 could output a time delayed version of the input signal. The outputs of the delay lines 611 would be sent to the mixing matrix 621 to form the output signal and at the same time also fed into the feedback matrix 612, and feedback signals output from the feedback matrix are in turn mixed with the next frame of the input signal at summers 613-1 to 613-3. It is to be noted that only the early and late responses are sent to the FDN and go through the three delay lines, and the direct response is sent to the mixing matrix directly and not to the FDN and thus it is not a part of the FDN.

However, one of the drawbacks of the early-late response lies in a sudden transition from the early response to the late response. That is, the BRIRs will be directional in the early response, but suddenly changes to a dense and diffusive late response. This is certainly different from a real BRIR and would affect the perceptual quality of the binaural virtualization. Thus, it is desirable if the idea as proposed in the present disclosure can be embodied in the FDN, which is a common structure for simulating the late response in a headphone virtualizer. Therefore, there is provided another solution hereinafter, which is realized by adding a bank of parallel HRTF filters in front of a feedback delay network (FDN). Each HRTF filter generates the left- and right-ear response corresponding to one room reflection. Detailed description will be made with reference to FIG. 7.

Figure 7:
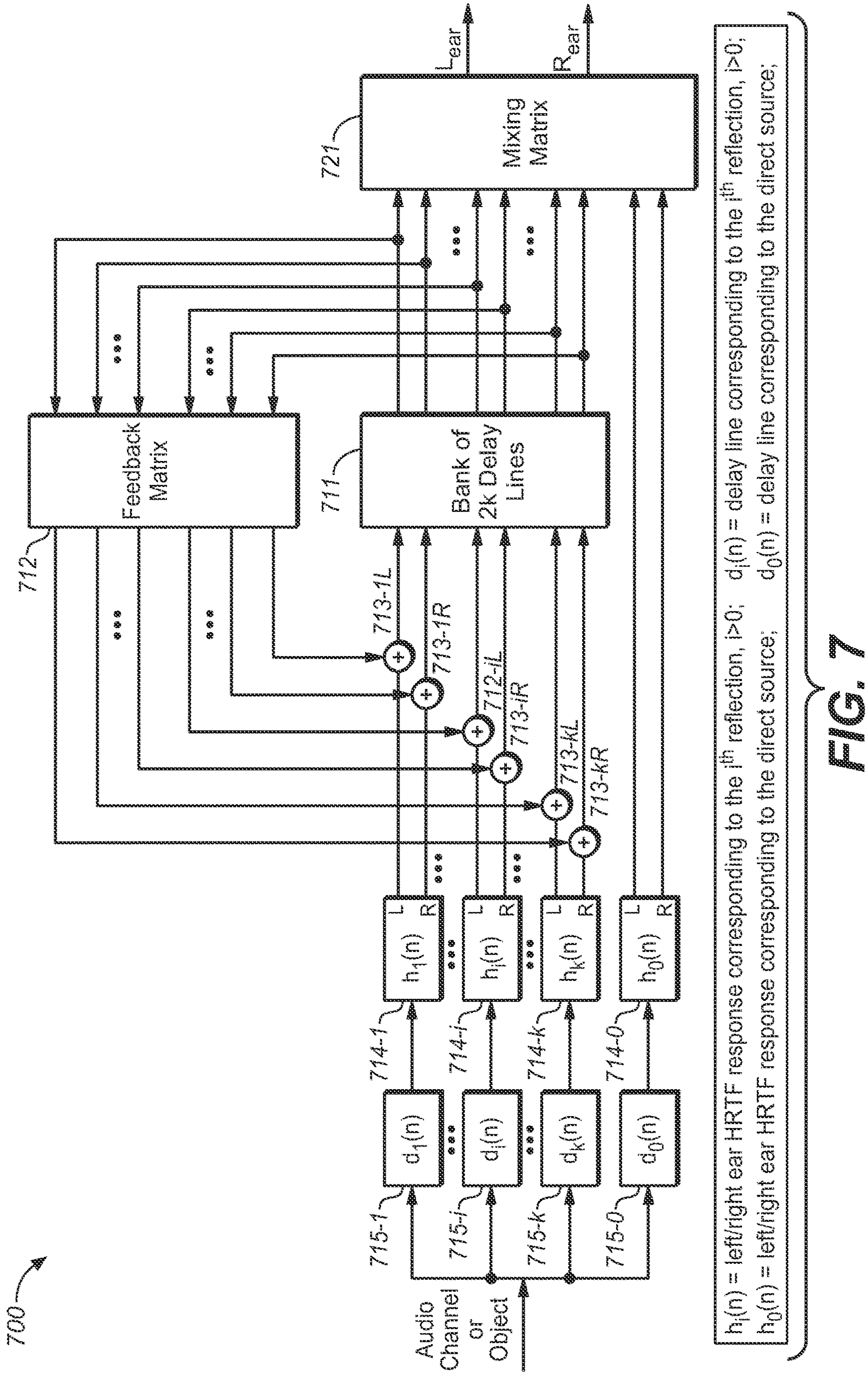
FIG. 7 is a block diagram of a system of reverberation generation for headphone virtualization in an FDN environment in accordance with another example embodiment of the present disclosure.

FIG. 7 illustrates a headphone virtualizer based on FDN in accordance with an example embodiment of the present disclosure. Different from FIG. 6, in the virtualizer 700, there are further arranged filters such as HRTF filters 714-0, 714-1, . . . **714-*i* . . . 714-*k* and delay lines such delay lines 715-0, 715-1, 715-*i*, . . . 715-*k*. Thus, the input signal will be delayed through delay lines 715-0, 715-1, 715-*i*, . . . 715-*k* to output different time delayed versions of the input signal, which are then preprocessed by filters such as HRTF filters 714-0, 714-1, . . . 714-*i* . . . 714-*k* before entering the mixing matrix 720 or the FDN, particularly before signals fed back through at least one feedback matrix are added. In some embodiments of the present disclosure, the delay value $d_0(n)$ for the delay line 715-0**, can be zero in order to save the memory storage. In other embodiments of the present disclosure, the delay value $d_0(n)$ can be set as a nonzero value so at to control the time delay between the object and the listener.

In FIG. 7, and the delay time of each of the delay lines and corresponding HRTF filters can be determined based on the method as described herein. Moreover, it will require a smaller number of filters (for example, 4, 5, 6, 7 or 8) and a part of the late response is generated through the FDN structure. In such a way, the reflections can be generated in a computationally more efficient way. At the same time, it may ensure that:

- The early part of the late response contains directional cues.
- All inputs to the FDN structure are directional, which allows outputs of the FDN to be directionally diffusive. Since the outputs of the FDN are now created by the summation of the directional reflections, it is more similar to a real-world BRIR generation, which means a smooth transition from the directional reflections and thus diffusive reflections are ensured.
- The direction of the early part of the late response can be controlled to have a predetermined direction of arrival. Different from the early reflections generated by the image model, the direction of the early part of the late response may be determined by different predetermined directional functions which represent characteristics of the early part of the late response. As an example, the aforementioned wobbling functions may be employed here to guide the selection process of the HRTF pairs$_{(h_i(n),\ 0\le i\le k)}$.

Thus, in the solution as illustrated in FIG. 7, directional cues are imparted to the audio input signal by controlling the direction of the early part of the late response so that they have a predetermined direction of arrival. Accordingly, a soft transition is achieved, which is from fully directional reflections (early reflections that will be processed by the model discussed earlier) to semi-directional reflections (the early part of the late response that will have the duality between directional and diffusive), and finally evolves to fully diffusive reflections (the reminder of the late response), instead of a hard directional to diffusive transition of the reflections in the general FDN.

It shall be understood that, the delay lines 715-0, 715-1, **715-*i*, . . . , 715-*k* can also be built in the FDN for implementation efficiency. Alternatively, they can also be tapped delay lines (a cascade of multiple delay units with HRTF filters at the output of each one), to achieve the same function as shown in FIG. 7** with less memory storage.

Figure 8:
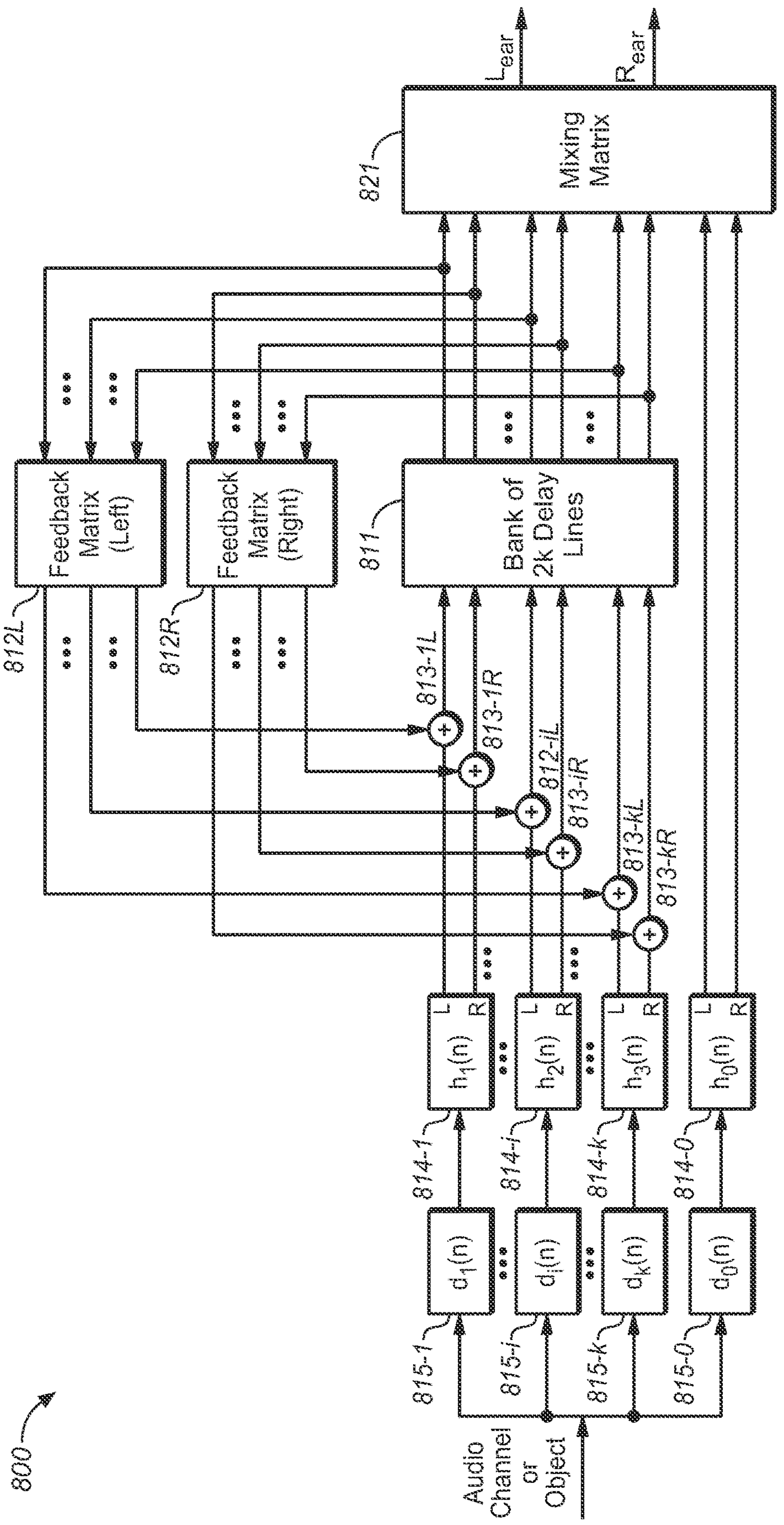
FIG. 8 is a block diagram of a system of reverberation generation for headphone virtualization in an FDN environment in accordance with a further example embodiment of the present disclosure.

In addition, FIG. 8 further illustrates a headphone virtualizer 800 based on FDN in accordance with another example embodiment of the present disclosure. The difference from the headphone virtualizer as illustrated in FIG. 7 lies in that, instead of one feedback matrix 712, two feedback matrixes 812L and 812R are used for the left ear and the right ear, respectively. In such a way, it could be more computationally efficient. Regarding the bank of delay lines 811, and summers 813-1L to 813-kL, 813-1R to 813*k*R, 814-0 to 814-*k*, these components are functionally similar to bank of delay lines 711, and summers 713-1L to 713-kL, 713-1R to 713*k*R, 714-0 to 714-*k*. That is, these components function in a matter such that they mix with the next frame of the input signal as shown in FIGS. 7 and 8, respectively, as such, their detailed description will be omitted for the purpose of simplification. In addition, delay lines 815-0, 815-1, 815-*i*, . . . 815-*k* also function in a similar way to delay lines 715-0, 715-1, 715-*i*, . . . 715-*k* and thus omitted herein.

Figure 9:
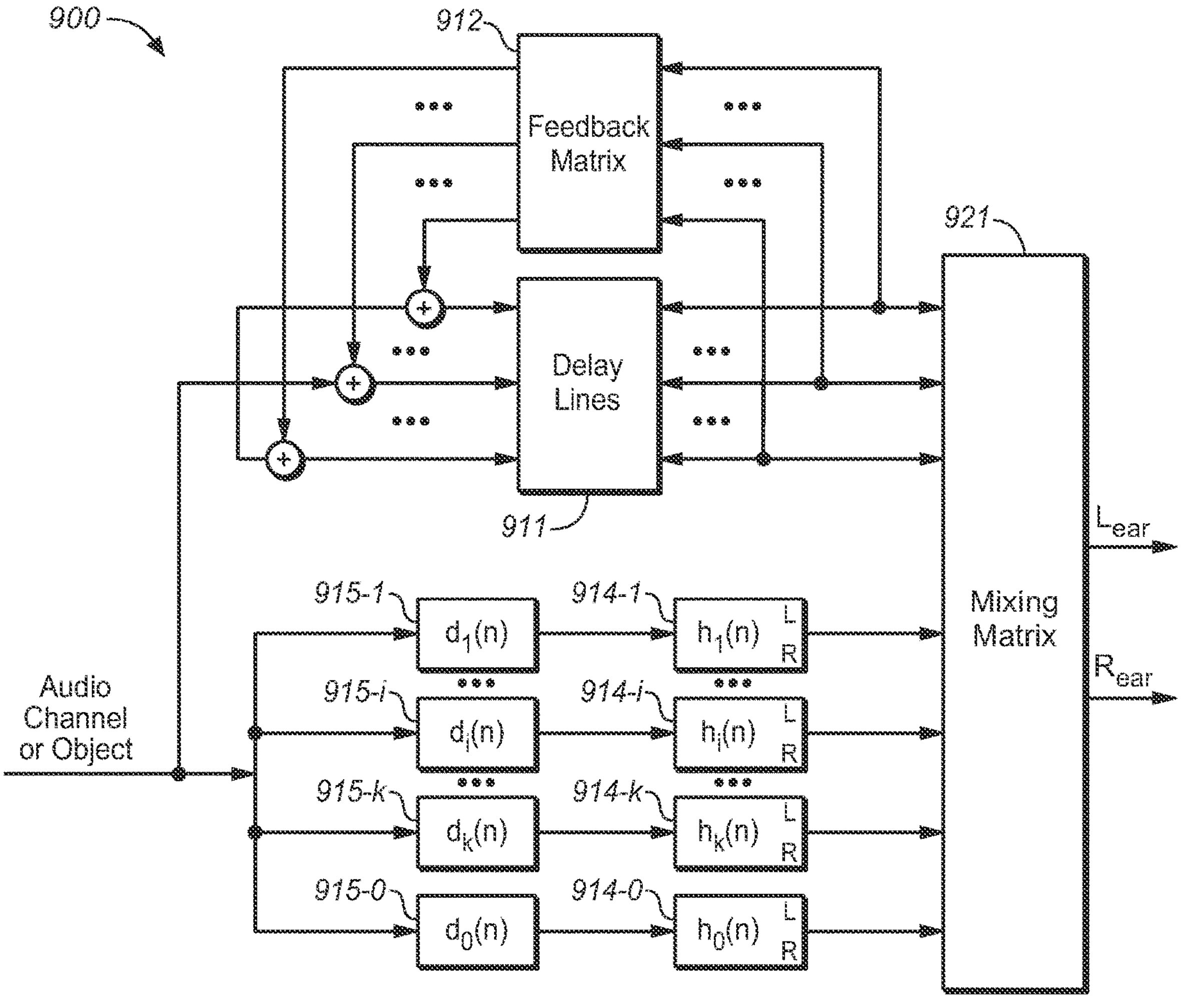
FIG. 9 is a block diagram of a system of reverberation generation for headphone virtualization in an FDN environment in accordance with a still further example embodiment of the present disclosure.

FIG. 9 further illustrates a headphone virtualizer 900 based on FDN in accordance with a further example embodiment of the present disclosure. Different from the headphone virtualizer as illustrated in FIG. 7, in FIG. 9, delay lines 915-0, 915-1, 915-*i*, . . . 915-*k* and HRTF filters 914-0, 914-1, . . . 914-*i* . . . 914-*k* are not connected with the FDN serially but connected therewith parallelly. That is to say, the input signal will be delayed through delay lines 915-0, 915-1, 915-*i*, . . . 915-*k* and be preprocessed by HRTF filters 914-0, 914-1, . . . 914-*i* . . . 914-*k* and then sent to the mixing matrix, in which the pre-proposed signals will be mixed with signals going through the FDN. Thus, the input signals pre-processed by HRTF filters are not sent to the FDN network but sent to the mixing matrix directly.

It should be noted that the structures illustrated in FIGS. 7 to 9 are fully compatible with assorted audio input formats including, but not limited to, channel-based audio as well as object-based audio. In fact, the input signals may be any of a single channel of the multichannel audio signal, a mixture of the multichannel signal, a signal audio object of the object-based audio signal, a mixture of the object-based audio signal, or any possible combinations thereof.

Figure 10:
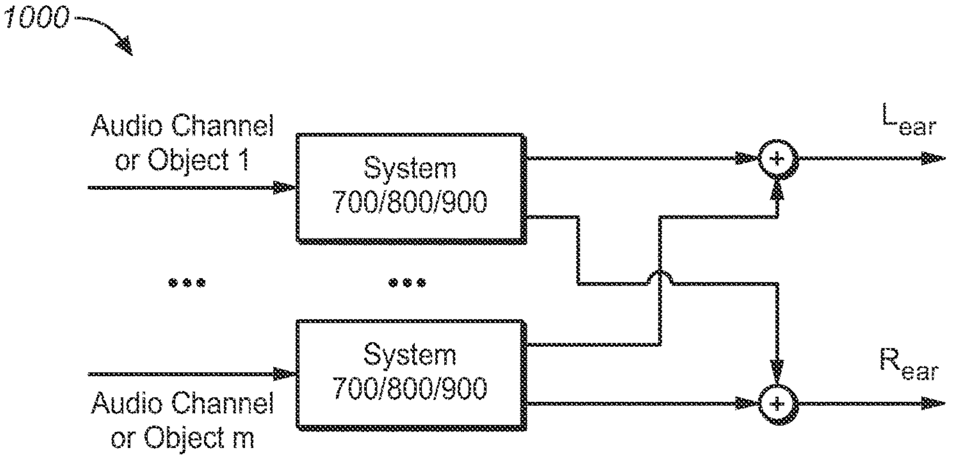
FIG. 10 is a block diagram of a system of reverberation generation for headphone virtualization for multiple audio channels or objects in an FDN environment in accordance with an example embodiment of the present disclosure.

In a case of multiple audio channels or objects, each channel or each object can be arranged with a dedicated virtualizer for processing the input signals. FIG. 10 illustrates a headphone virtualizing system 1000 for multiple audio channels or objects in accordance with an example embodiment of the present disclosure. As illustrated in FIG. 10, input signals from each audio channel or object will be processed by a separate virtualizer such as virtualizer 700, 800, or 900. The left output signals from each of the virtualizer can be summed up so as to form the final left output signals, and the right output signals from each of the virtualizer can be summed up so as to form the final right output signals.

The headphone virtualizing system 1000 can be used especially when there are enough computing resources; however, for application with limited computing resources, it requires another solution since computing resources required by the system 1000 will be unacceptable for these applications. In such a case, it is possible to obtain a mixture of the multiple audio channels or objects with their corresponding reflections before the FDN or in parallel with the FDN. In other words, audio channels or objects with their corresponding reflections can be processed and converted into a single audio channel or object signal.

Figure 11:
FIG. 11A/11B are block diagrams of a system of reverberation generation for headphone virtualization for multiple audio channels or objects in an FDN environment in accordance with another example embodiment of the present disclosure.
Figure 11A:
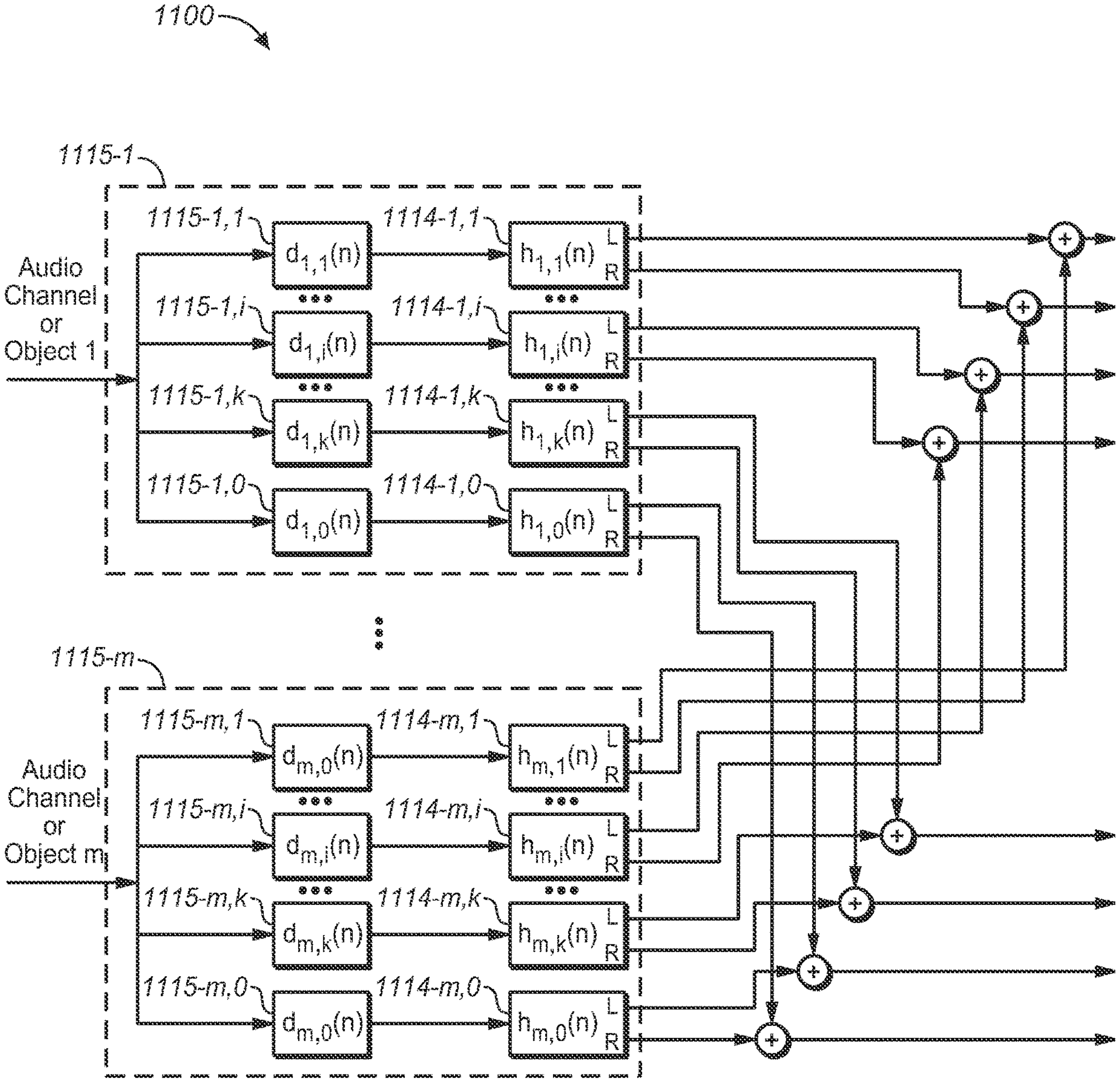
Figure 11B:
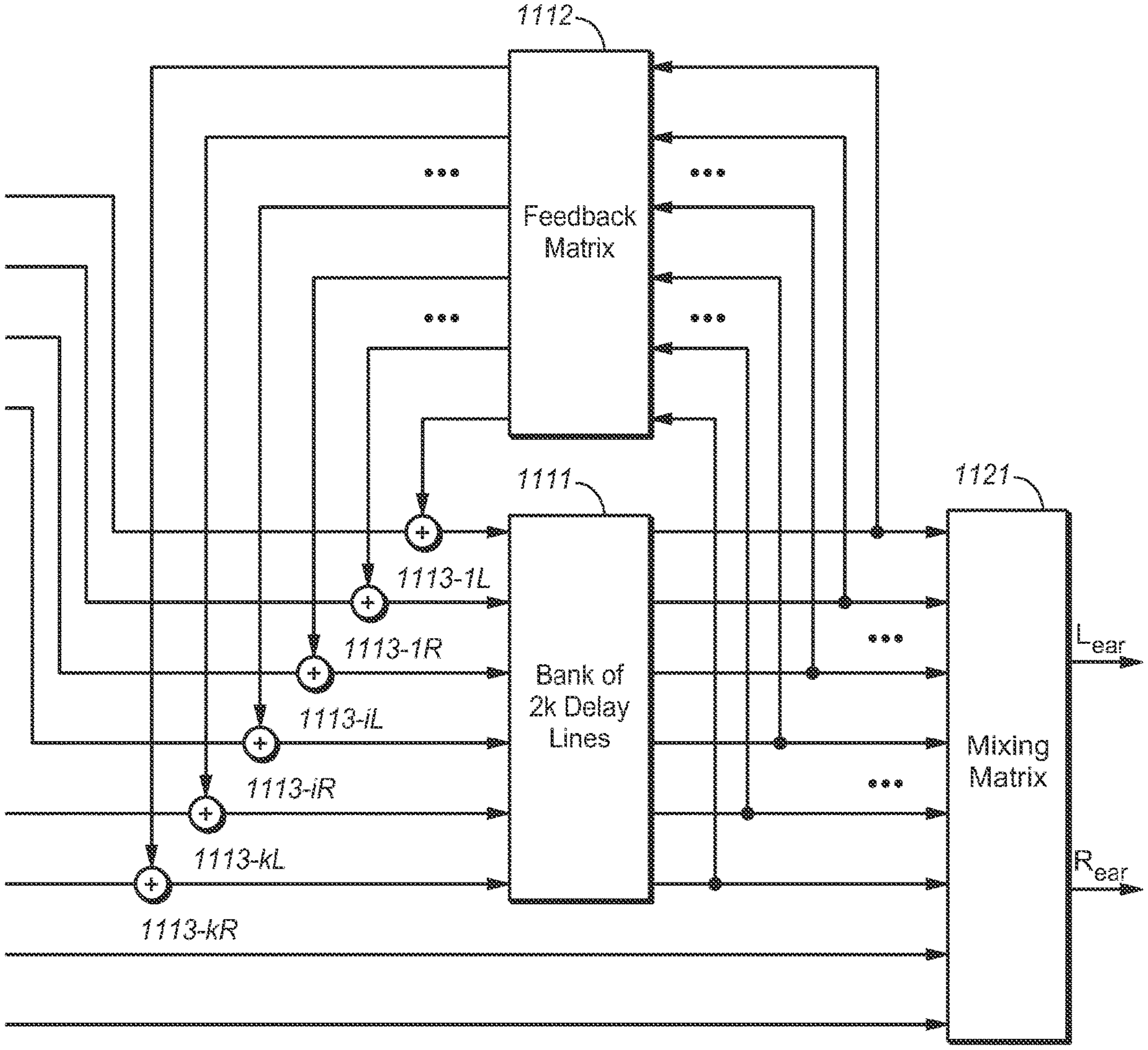

FIGS. 11A/B illustrates a headphone virtualizing system 1100 for multiple audio channels or objects in accordance with another example embodiment of the present disclosure. Different from that illustrated in FIG. 7, in the system 1100, there are provided m reflection delay and filter networks 1115-1 to 1115-*m* for m audio channels or objects. Each reflection delay and filter network 1115-1, . . . or 1115-*m* includes k+1 delay lines and k+1 HRTF filters, where one delay line and one HRTF filter are used for the direct response and other delay lines and other HRTF filter are used for the early and late responses. As illustrated, for audio channel or object 1, an input signal goes through the first reflection delay and filter network 1115-1, that is to say, the input signal is first delayed through delay lines 1115-1,0, 1115-1,1, 1115-1,*i*, . . . , 1115-1, k and then are filtered by HRTF filters 1114-1,0, 1114-1,1, . . . 1114-1,*i* . . . 1114-1,*k*; for audio channel or object m, an input signal goes through the m-th reflection delay and filter network 1115-*m*, that is to say, the input signal is first delayed through delay lines 1115-*m*,0, 1115-*m*,1, 1115-*m,i*, 1115-*m,k* and then then are filtered by HRTF filters 1114-*m*,0, 1114-*m*,1, . . . 1114-*m,i* . . . 1114-*m,k*. The left output signal from each of HRTF filters 1114-1,1, . . . ,1114-1,*i*, . . . ,1114-1,*k*, and 1114-1,0, in the reflection delay and filter network 1115-1 are combined with left output signals from corresponding HRTF filters in other reflection delay and filter networks 1115-2 to 1115-*m*, the obtained left output signals for early and late responses are sent to summers in FDN and the left output signal for the direct response is sent to the mixing matrix directly. Similarly, the right output signal from each of HRTF filters 1114-1,1, . . . ,1114-1,*i*, . . . ,1114-1,*k*, and 1114-1,0, in the reflection delay and filter network 1115-1 are combined with right output signals from corresponding HRTF filters in other reflection delay and filter networks 1115-2 to 1115-*m* and the obtained right output signals for early and late responses are sent to summers in FDN and the right output signal as the direct response is sent to the mixing matrix directly.

Figure 12:
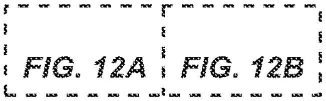
FIG. 12A/12B are block diagrams of a system of reverberation generation for headphone virtualization for multiple audio channels or objects in an FDN environment in accordance with a further example embodiment of the present disclosure.
Figure 12A:
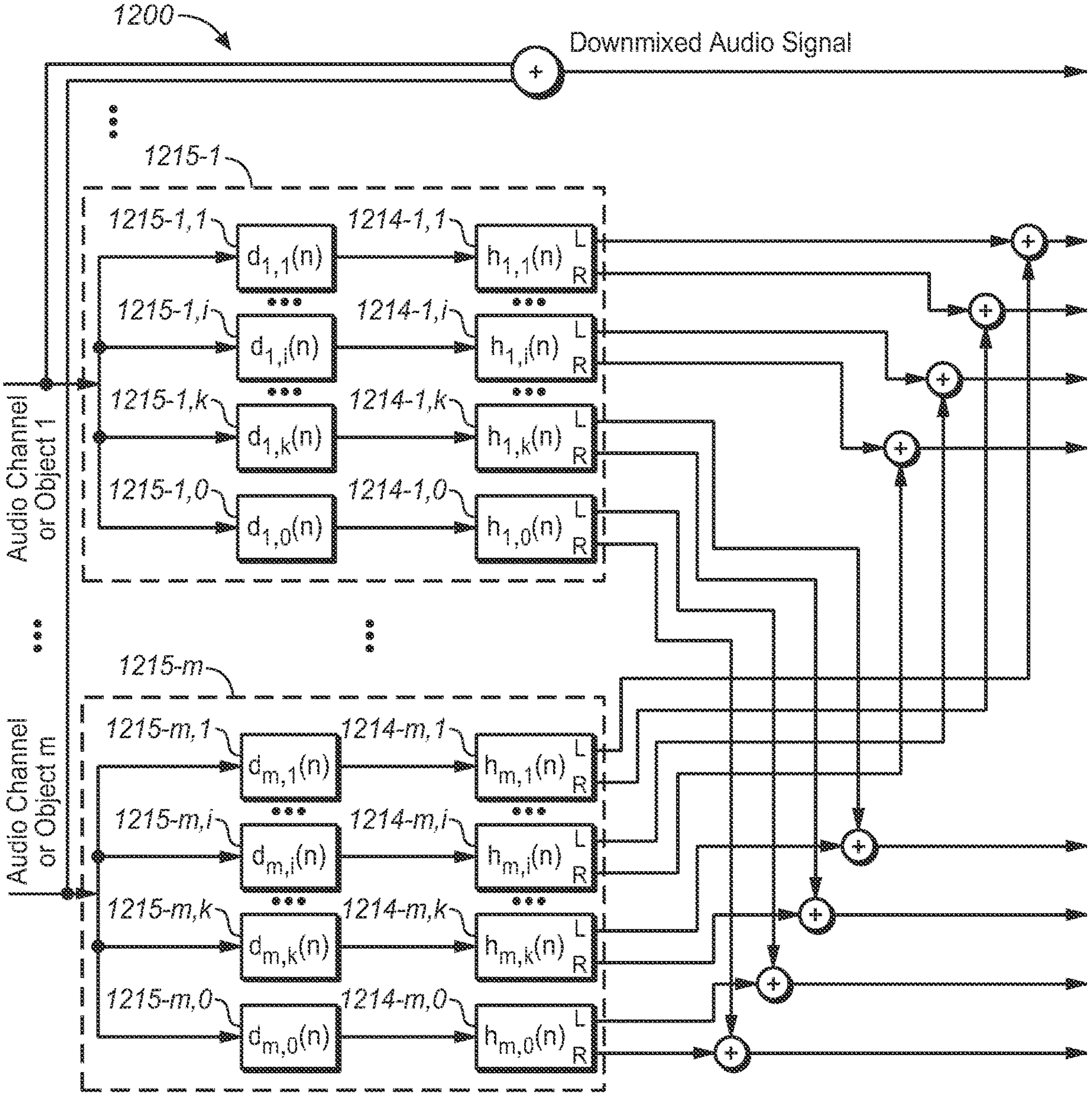
Figure 12B:
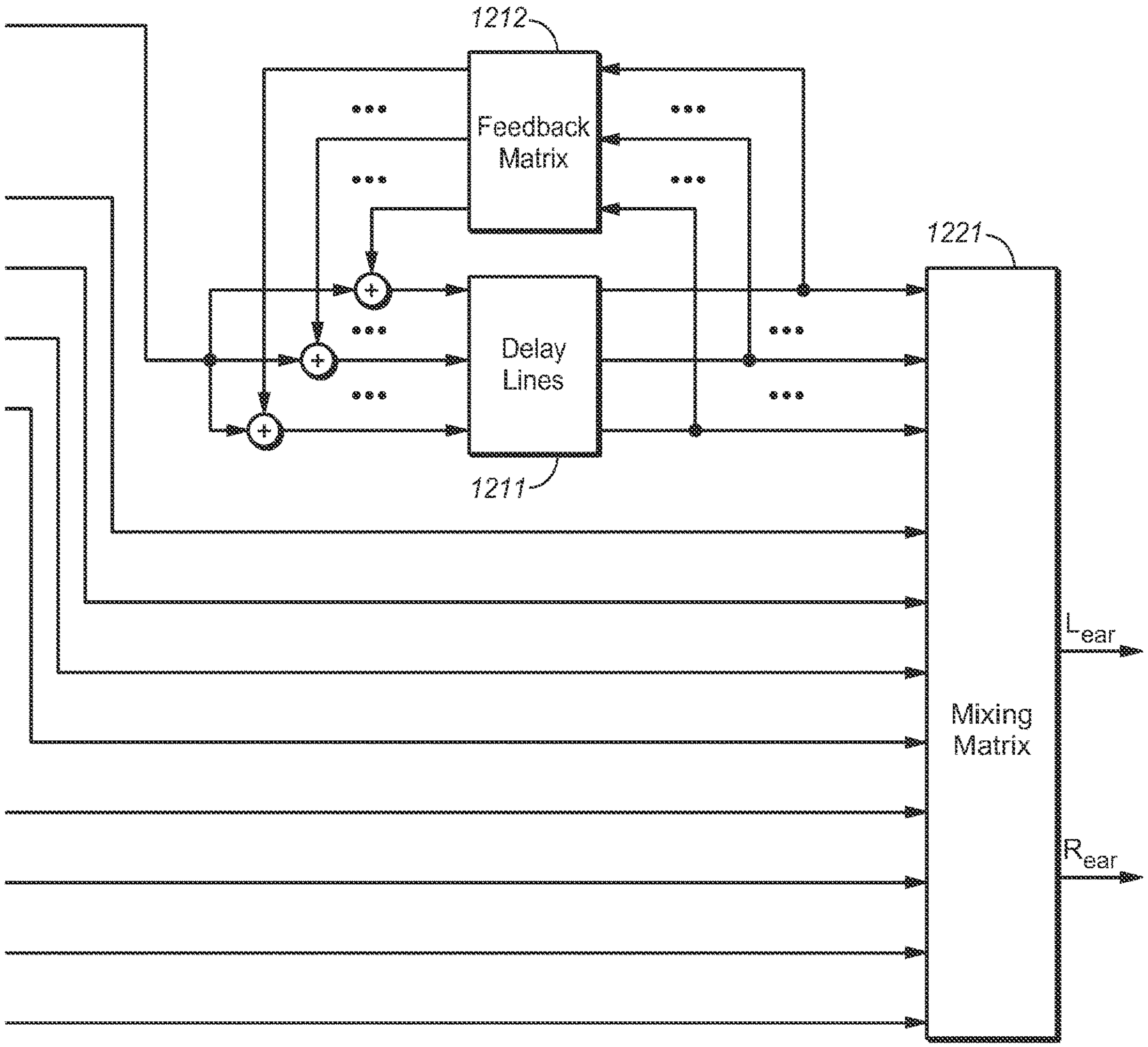

FIGS. 12A/12B illustrates a headphone virtualizing system 1200 for multi-channel or multi-object in accordance with a further example embodiment of the present disclosure. Different from FIGS. 11A/11B, the system 1200 is built based on the structure of system 900 as illustrated in FIG. 9. In the system 1200, there are also provided m reflection delay and filter networks 1215-1 to 1215-*m* for m audio channels or objects. The reflection delay and filter networks 1215-1 to 1215-*m* are similar to those illustrated in FIGS. 11A/11B and the difference lies in that k+1 summed left output signals and k+1 summed right output signals from reflection delay and filter networks 1215-1 to 1215-*m* are directly sent to the mixing matrix 1221 and none of them are sent to the FDN; and at the same time, input signals from m audio channels or objects are summed up to obtain a downmixed audio signal which is provided to the FDN and further sent to the mixing matrix 1221. Thus, in system 1200, there is provided a separate reflection delay and filter network for each audio channel or object and the output of the delay and filter networks are summed up and then mixed with those from FDN. In such a case, each early reflection will appear once in the final BRIR and has no further effect on the left/right output signals and the FDN will provide a purely diffuse output.

In addition, in FIG. 12A/12B, the summers between the reflection delay and filter networks 1215-1 to 1215-*m* and the mixing matrix can also be removed. That is to say, the outputs of the delay and filter networks can be directly provided to the mixing matrix 1221 without summing and mixed with output from FDN.

In a still further embodiment of the present disclosure, the audio channels or objects may be down mixed to form a mixture signal with a domain source direction and in such a case the mixture signal can be directly input to the system 700, 800 or 900 as a single signal. Next, reference will be made to FIG. 13 to describe the embodiment, wherein FIG. 13 illustrates a headphone virtualizing system 1300 for multiple audio channels or objects in accordance with a still further example embodiment of the present disclosure.

Figure 13:
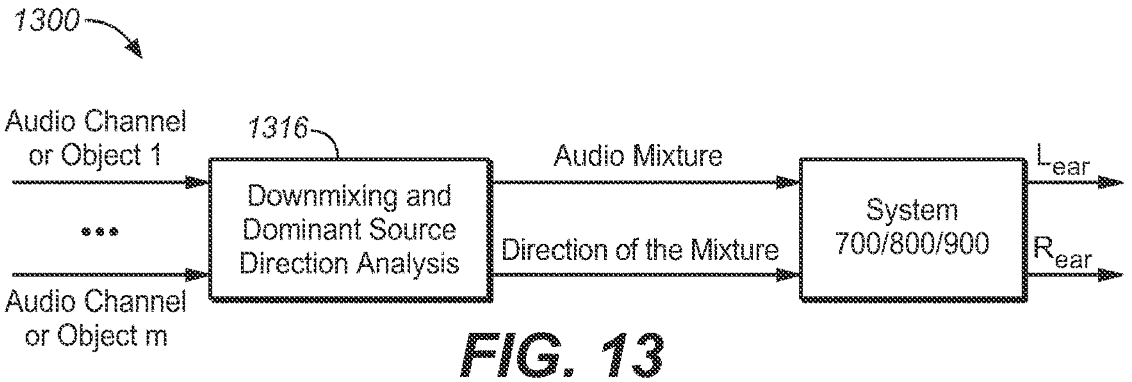
FIG. 13 is a block diagram of a system of reverberation generation for headphone virtualization for multiple audio channels or objects in an FDN environment in accordance with a still further example embodiment of the present disclosure.

As illustrated in FIG. 13, audio channels or objects 1 to m are first sent to a downmixing and dominant source direction analysis module 1316. In the downmixing and dominant source direction analysis module 1316, audio channels or objects 1 to m will be further downmixed into an audio mixture signal through for example summing and the dominant source direction can be further analyzed on audio channels or objects 1 to m to obtain the dominant source direction of audio channels or objects 1 to m. In such a way, it is possible to obtain a single channel audio mixture signal with a source direction for example in azimuth and elevation. The resulting single channel audio mixture signal can be input into the system 700, 800 or 900 as a single audio channel or object.

The dominant source direction can be analyzed in the time domain or in the time-frequency domain by means of any suitable manners, such as those already used in the existing source direction analysis methods. Hereinafter, for a purpose of illustration, an example analysis method will be described in the time-frequency domain.

As an example, in the time-frequency domain, the sound source of the $a_i$-th audio channel or object can be represented by a sound source vector $a_i(n,k)$, which is a function of its azimuth $\mu_i$, elevation $\eta_i$, and a gain variable $g_i$, and can be given by:

$$a_i(n, k) = g_i(n, k)\cdot\begin{bmatrix}\vartheta_i\\ \varepsilon_i\\ \zeta_i\end{bmatrix} = g_i(n, k)\cdot\begin{bmatrix}\cos\mu_i\cdot\cos\eta_i\\ \sin\mu_i\cdot\cos\eta_i\\ \sin\eta_i\end{bmatrix}$$

wherein k and n are frequency and temporal frame indices, respectively; $g_i(n,k)$ represents the gain for this channel or object; $[\vartheta_i\ \varepsilon_i\ \xi_i]^T$ is the unit vector representing the channel or object location. The overall source level $g_s(n,k)$ contributed by all of the speakers can be given by:

$$g_s^2(n, k) = \left[\sum_{i=1}^{k} g_i(n, k)\cdot\|\vartheta_i\|\right]^2 + \left[\sum_{i=1}^{k} g_i(n, k)\cdot\|\varepsilon_i\|\right]^2 + \left[\sum_{i=1}^{k} g_i(n, k)\cdot\|\xi_i\|\right]^2$$

The single channel downmixed signal can be created by applying the phase information $e^{\varphi}$ chosen from the channel with the highest amplitude in order to maintain phase consistence, which may be given by:

$$a(n,k)=\sqrt{g^2{}_s(n,k)}\cdot e\varphi$$

The direction of the downmixed signal, presented by its azimuth $\theta(n, k)$ and elevation $\phi(n,k)$, can then be given by:

$$\tan\theta(n, k) = \frac{\sum_{i=1}^{k} g_i(n, k)\cdot\vartheta_i}{\sum_{i=1}^{k} g_i(n, k)\cdot\varepsilon_i}$$

-continued $$\tan\phi(n, k) = \frac{\sqrt{\left[\sum_{i=1}^{k} g_i(n, k)\cdot\vartheta_i\right]^2 + \left[\sum_{i=1}^{k} g_i(n, k)\cdot\varepsilon_i\right]^2}}{\sum_{i=1}^{k} g_i(n, k)\cdot\xi_i}$$

In such a way, the domain source direction for the audio mixture signal can be determined. However, it can be understood that the present disclosure is not limited to the above-described example analysis method, and any other suitable methods are also possible, for example, those in the time frequency.

It shall be understood that the mixing coefficients for early refection in mixing matrix can be an identity matrix. The mixing matrix is to control the correlation between the left output and the right output. It shall be understood that all these embodiments can be implemented in both time domain and frequency domain. For an implementation in the frequency domain, the input can be parameters for each band and the output can be processed parameters for the band.

Besides, it is noted that the solution proposed herein can also facilitate the performance improvement of the existing binaural virtualizer without any necessity of any structural modification. This can be achieved by obtaining an optimal set of parameters for the headphone virtualizer based on the BRIR generated by the solution proposed herein. The parameter can be obtained by an optimal process. For example, the BRIR created by the solution proposed herein (for example with regard to FIGS. 1 to 5) can set a target BRIR, then the headphone virtualizer of interest is used to generate BRIR. The difference between the target BRIR and the generated BRIR is calculated. Then the generating of BRIR and the calculating of difference are repeated until all possible combinations of the parameters are covered. Finally, the optimal set of parameters for the headphone virtualizer of interest would be selected, which can minimize the difference between the target BRIR and the generated BRIR. The measurement of the similarity or difference between two BRIRs can be achieved by extracting the perceptual cues from the BRIRs. For example, the amplitude ratio between left and right channels may be employed as a measure of the wobbling effect. In such a way, with the optimal set of parameters, even the existing binaural virtualizer might achieve a better virtualization performance without any structural modification.

Figure 14:
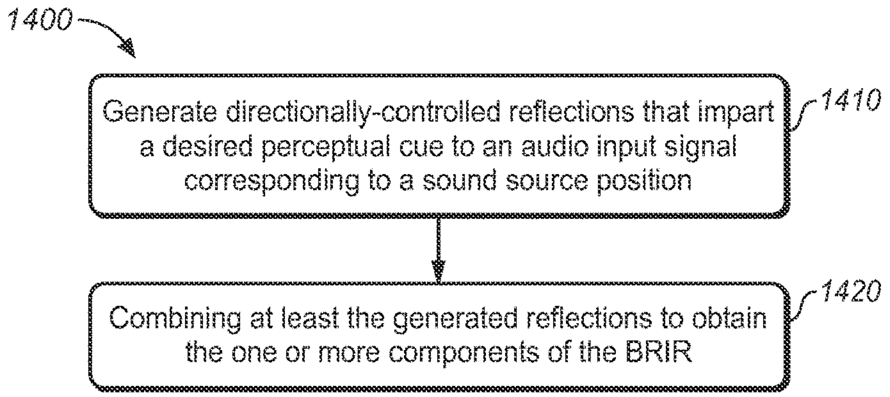
FIG. 14 is a flowchart of a method of generating one or more components of a BRIR in accordance with an example embodiment of the present disclosure.

FIG. 14 further illustrates a method of generating one or more components of a BRIR in accordance with an example embodiment of the present disclosure.

As illustrated in FIG. 14, the method 1400 is entered at step 1410, where the directionally-controlled reflections are generated, and wherein the directionally-controlled reflections can impart a desired perceptual cue to an audio input signal corresponding to a sound source location. Then at step 1420, at least the generated reflections are combined to obtain one or more components of the BRIR. In embodiments of the present disclosure, to avoid limitations of a particular physical room or room model, a direction control can be applied to the reflections. The predetermined direction of arrival may be selected so as to enhance an illusion of a virtual sound source at a given location in space. Particularly, the predetermined direction of arrival can be of a wobble shape in which reflection directions slowly evolve away from a virtual sound source and oscillate back and forth. The change in reflection direction imparts a time-varying IACC to the simulated response that varies as a function of time and frequency, which offers a natural sense of space while preserving audio fidelity. Especially, the predetermined direction of arrival may further include a stochastic diffuse component within a predetermined azimuths range. As a result, it further introduces diffuseness, which provides better externalization. Moreover, the wobble shapes and/or the stochastic diffuse component can be selected based on a direction of the virtual sound source so that the externalization could be further improved.

In an embodiment of the present disclosure, during generating reflections respective occurrence time points of the reflections are determined scholastically within a predetermined echo density distribution constraint. Then desired directions of the reflections are determined based on the respective occurrence time points and the predetermined directional pattern, and amplitudes of the reflections at the respective occurrence time points are determined scholastically. Then based on the determined values, the reflections with the desired directions and the determined amplitudes at the respective occurrence time points are generated. It should be understood that the present disclosure is not limited to the order of operations as described above. For example, operations of determining desired directions and determining amplitudes of the reflections can be performed in a reverse sequence or performed simultaneously.

In another embodiment of the present disclosure, the reflections at the respective occurrence time points may be created by selecting, from head-related transfer function (HRTF) data sets measured for particular directions, HRTFs based on the desired directions at the respective occurrence time points and then modifying the HRTFs based on the amplitudes of the reflections at the respective occurrence time points In an alternative embodiment of the present disclosure, creating reflections may also be implemented by determining HRTFs based on the desired directions at the respective occurrence time points and a predetermined spherical head model and afterwards modifying the HRTFs based on the amplitudes of the reflections at the respective occurrence time points so as to obtain the reflections at the respective occurrence time points.

In another alternative embodiment of the present disclosure, creating reflections may include generating impulse responses for two ears based on the desired directions and the determined amplitudes at the respective occurrence time points and broadband interaural time difference and interaural level difference of a predetermined spherical head model. Additionally, the created impulse responses for two ears may be further filtered through all-pass filters to obtain further diffusion and decorrelation.

In a further embodiment of the present disclosure, the method is operated in a feedback delay network. In such a case, the input signal is filtered through HRTFs, so as to control at least directions of early part of late responses to meet the predetermined directional pattern. In such a way, it is possible to implement the solution in a more computationally efficient way Additionally, an optimal process is performed. For example, generating reflections may be repeated to obtain a plurality of groups of reflections and then one of the plurality of groups of reflections having an optimal reflection characteristic may be selected as the reflections for inputting signals. Or alternatively, generating reflections may be repeated till a predetermined reflection characteristic is obtained. In such way, it is possible to further ensure that reflections with desirable reflection characteristic are obtained.

It can be understood that for a purpose of simplification, the method as illustrated in FIG. 14 is described in brief; for detailed description of respective operations, one can find in the corresponding description with reference FIGS. 1 to 13.

It can be appreciated that although specific embodiments of the present disclosure are described herein, those embodiments are only given for an illustration purpose and the present disclosure is not limited thereto. For example, the predetermined directional pattern could be any appropriate pattern other than the wobble shape or can be a combination of multiple directional patterns. Filters can also be any other type of filters instead of HRTFs. During generating the reflections, the obtained HRTFs can be modified in accordance with the determined amplitude in any way other than that illustrated in Eqs. 2A and 2B. The summers 121-L and 121-R as illustrated in FIG. 1 can be implemented in a single general summer instead of two summers. Moreover, the arrangement of the delayer and filter pair can be changed in reverse which means that it might require delayers for the left ear and the right ear respectively. Besides, the mixing matrix as illustrated in FIGS. 7 and 8 is also possibly implemented by two separate mixing matrixes for the left ear and the right ear respectively.

In addition, it is to also be understood that the components of any of the systems 100, 700, 800, 900, 1000, 1100, 1200 and 1300 may be hardware modules or software modules. For example, in some example embodiments, the system may be implemented partially or completely as software and/or firmware, for example, implemented as a computer program product embodied in a computer readable medium. Alternatively or additionally, the system may be implemented partially or completely based on hardware, for example, as an integrated circuit (IC), an application-specific integrated circuit (ASIC), a system on chip (SOC), a field programmable gate array (FPGA), and the like.

Figure 15:
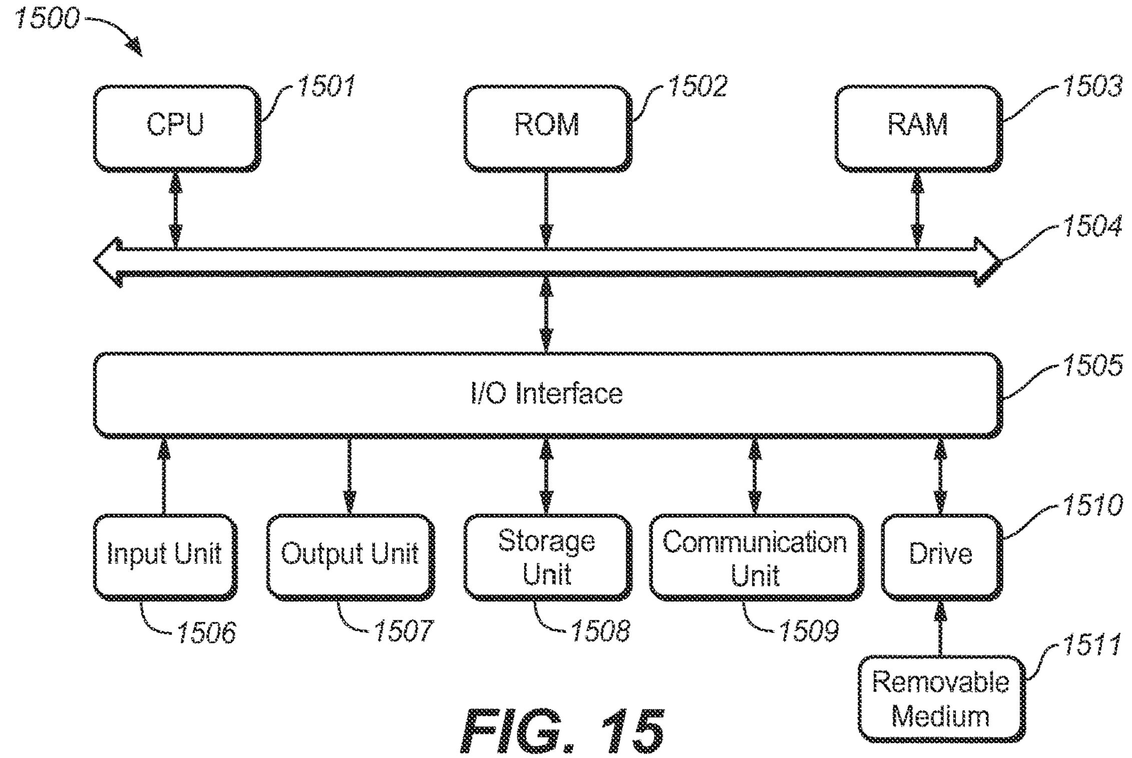
FIG. 15 is a block diagram of an example computer system suitable for implementing example embodiments of the present disclosure.

FIG. 15 shows a block diagram of an example computer system 1500 suitable for implementing example embodiments of the present disclosure. As shown, the computer system 1500 includes a central processing unit (CPU) 1501 which is capable of performing various processes in accordance with a program stored in a read only memory (ROM) 1502 or a program loaded from a storage unit 1508 to a stochastic access memory (RAM) 1503. In the RAM 1503, data required when the CPU 1501 performs the various processes or the like is also stored as required. The CPU 1501, the ROM 1502 and the RAM 1503 are connected to one another via a bus 1504. An input/output (I/O) interface 1505 is also connected to the bus 1504.

The following components are connected to the I/O interface 1505: an input unit 1506 including a keyboard, a mouse, or the like; an output unit 1507 including a display such as a cathode ray tube (CRT), a liquid crystal display (LCD), or the like, and a loudspeaker or the like; the storage unit 1508 including a hard disk or the like; and a communication unit 1509 including a network interface card such as a LAN card, a modem, or the like. The communication unit 1509 performs a communication process via the network such as the internet. A drive 1510 is also connected to the I/O interface 1505 as required. A removable medium 1511, such as a magnetic disk, an optical disk, a magneto-optical disk, a semiconductor memory, or the like, is mounted on the drive 1510 as required, so that a computer program read therefrom is installed into the storage unit 1508 as required.

Specifically, in accordance with example embodiments of the present disclosure, the processes described above may be implemented as computer software programs. For example, embodiments of the present disclosure include a computer program product including a computer program tangibly embodied on a machine readable medium, the computer program including program code for performing methods. In such embodiments, the computer program may be downloaded and mounted from the network via the communication unit 1509, and/or installed from the removable medium 1511.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination.

Various modifications, adaptations to the foregoing example embodiments of this invention may become apparent to those skilled in the relevant arts in view of the foregoing description, when read in conjunction with the accompanying drawings. Any and all modifications will still fall within the scope of the non-limiting and example embodiments of this invention. Furthermore, other embodiments of the inventions set forth herein will come to mind to one skilled in the art to which these embodiments of the invention pertain having the benefit of the teachings presented in the foregoing descriptions and the drawings.

The present disclosure may be embodied in any of the forms described herein. For example, the following enumerated example embodiments (EEEs) describe some structures, features, and functionalities of some aspects of the present disclosure.

EEE1. A method for generating one or more components of a binaural room impulse response (BRIR) for headphone virtualization, including: generating directionally-controlled reflections that impart a desired perceptual cue to an audio input signal corresponding to a sound source location; and combining at least the generated reflections to obtain the one or more components of the BRIR.

EEE2. The method of EEE1, wherein the desired perceptual cues lead to a natural sense of space with minimal side effects.

EEE 3. The method of EEE 1, wherein the directionally-controlled reflections have a predetermined direction of arrival in which an illusion of a virtual sound source at a given location in space is enhanced.

EEE 4. The method of EEE 3, wherein the predetermined directional pattern is of a wobble shape in which reflection directions change away from a virtual sound source and oscillate back and forth therearound.

EEE 5. The method of EEE 3, wherein the predetermined directional pattern further includes a stochastic diffuse component within a predetermined azimuths range, and wherein at least one of the wobble shapes or the stochastic diffuse components is selected based on a direction of the virtual sound source.

EEE 6. The method of EEE 1, wherein generating directionally-controlled reflections includes: determining respective occurrence time points of the reflections scholastically under a predetermined echo density distribution constraint; determining desired directions of the reflections based on the respective occurrence time points and the predetermined directional pattern; determining amplitudes of the reflections at the respective occurrence time points scholastically; and creating the reflections with the desired directions and the determined amplitudes at the respective occurrence time points.

EEE 7. The method of EEE 6, wherein creating the reflections includes:

selecting, from head-related transfer function (HRTF) data sets measured for particular directions, HRTFs based on the desired directions at the respective occurrence time points; and modifying the HRTFs based on the amplitudes of the reflections at the respective occurrence time points so as to obtain the reflections at the respective occurrence time points.

EEE 8. The method of EEE 6, wherein creating the reflections includes: determining HRTFs based on the desired directions at the respective occurrence time points and a predetermined spherical head model; and modifying the HRTFs based on the amplitudes of the reflections at the respective occurrence time points so as to obtain the reflections at the respective occurrence time points.

EEE 9. The method of EEE 5, wherein creating the reflections includes: generating impulse responses for two ears based on the desired directions and the determined amplitudes at the respective occurrence time points and based on broadband interaural time difference and interaural level difference of a predetermined spherical head model.

EEE 10. The method of EEE 9, wherein creating the reflections further includes:

filtering the created impulse responses for two ears through all-pass filters to obtain a diffusion and decorrelation.

EEE 11. The method of EEE 1, wherein the method is operated in a feedback delay network, and wherein generating reflections includes filtering the audio input signal through HRTFs, so as to control at least directions of an early part of late responses to impart desired perceptual cues to the input signal.

EEE 12. The method of EEE 11, wherein the audio input signal is delayed by delay lines before it is filtered by the HRTFs.

EEE 13. The method of EEE 11, wherein the audio input signal is filtered before signals fed back through at least one feedback matrix are added.

EEE 14. The method of EEE 11, wherein the audio input signal is filtered by the HRTFs in parallel with the audio input signal being inputted into the feedback delay network, and wherein output signals from the feedback delay network and from the HRTFs are mixed to obtain the reverberation for headphone virtualization.

EEE15. The method of EEE11, wherein for multiple audio channels or objects, an input audio signal for each of the multiple audio channels or objects is separately filtered by the HRTFs.

EEEE16. The method of EEE 11, wherein for multiple audio channels or objects, input audio signals for the multiple audio channels or objects are downmixed and analyzed to obtain an audio mixture signal with a dominant source direction, which is taken as the input signal.

EEE17. The method of EEE1, further including performing an optimal process by:

repeating the generating reflections to obtain a plurality of groups of reflections and selecting one of the plurality of groups of reflections having an optimal reflection characteristic as the reflections for the input signal; or repeating the generating reflections till a predetermined reflection characteristic is obtained.

EEE18. The method of EEE17, wherein the generating reflections is driven in part by at least some of the random variables generated based on a stochastic mode.

It will be appreciated that the embodiments of the present invention are not to be limited to the specific embodiments as discussed above and that modifications and other embodiments are intended to be included within the scope of the appended claims. Although specific terms are used herein, they are used in a generic and descriptive sense and are not for purposes of limitation.

The invention claimed is:

1. A system, comprising:

a filtering unit configured to convolve a pair of binaural room impulse responses, BRIRs, containing directionally controlled reflections that impart a desired perceptual cue, with an audio input signal to produce a set of left-ear and right-ear intermediate signals, wherein the directionally controlled reflections have a directional pattern in which a direction of arrival changes as a function of time;

a hardware-based stochastic echo generator configured to generate coefficients for the filtering unit for adding a stochastic component to the BRIRs; and a hardware-based combining unit configured to receive the intermediate signals and combine them to form a binaural output signal.

2. The system of claim 1, wherein the audio input signal corresponds to a sound source location, and wherein the directional pattern describes how directions of arrival of the directionally-controlled reflections change in relation to a direction of the sound source location as a function of time.

3. The system of claim 1, wherein coefficients for the filtering unit are derived from a Head-Related Transfer Function (HRTF) data set, where each filter of the filtering unit provides perceptual cues corresponding to one reflection from a predetermined direction for both a left ear and a right ear.

4. The system of claim 1, wherein the combining unit comprises a left summer and a right summer, wherein all left-ear intermediate signals are mixed in the left summer to produce a left binaural output signal, and all right-ear intermediate signals are mixed in the right summer to produce a right binaural output signal.

5. A method, comprising:

convolving, using a filtering unit, a pair of binaural room impulse responses, BRIRs, containing directionally controlled reflections that impart a desired perceptual cue, with an audio input signal to produce a set of left-ear and right-ear intermediate signals, wherein the directionally controlled reflections have a directional pattern in which a direction of arrival changes as a function of time;

generating coefficients for the filtering unit for adding a stochastic component to the BRIRs; and combining the intermediate signals to form a binaural output signal.

6. The method of claim 5, wherein the audio input signal corresponds to a sound source location, and wherein the directional pattern describes how directions of arrival of the directionally-controlled reflections change in relation to a direction of the sound source location as a function of time.

7. The method of claim 5, wherein coefficients for the filtering unit are derived from a Head-Related Transfer Function (HRTF) data set, where each filter of the filtering unit provides perceptual cues corresponding to one reflection from a predetermined direction for both a left ear and a right ear.

8. A non-transitory computer-readable medium storing instructions which, when executed by a computing device or system, cause said computing device or system to perform the method according to claim 5.

* * * * *